United States Patent
Suzuki et al.

(10) Patent No.: US 6,473,083 B1
(45) Date of Patent: *Oct. 29, 2002

(54) COMPUTER GRAPHICS DATA GENERATING APPARATUS, COMPUTER GRAPHICS ANIMATION EDITING APPARATUS, AND ANIMATION PATH GENERATING APPARATUS

(75) Inventors: Kaori Suzuki, Kawasaki (JP); Atsuko Tada, Kawasaki (JP); Hiroshi Kamada, Kawasaki (JP); Katsuhiko Hirota, Nagano (JP); Asako Yumoto, Kawasaki (JP); Satoshi Kasai, Shizuoka (JP); Kazumi Shibata, Shizuoka (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/597,075

(22) Filed: Feb. 5, 1996

(30) Foreign Application Priority Data

Feb. 3, 1995 (JP) .............................................. 7-016766
Feb. 3, 1995 (JP) .............................................. 7-016767

(51) Int. Cl.⁷ .............................................. G06T 17/00
(52) U.S. Cl. ..................................................... 345/426
(58) Field of Search ................. 395/119–123, 125–127, 395/133, 134, 326, 357, 358; 345/419–423, 426, 427, 620

(56) References Cited

U.S. PATENT DOCUMENTS 5,414,801 A * 5/1995 Smith et al. ............ 395/120 X

OTHER PUBLICATIONS

Foley et al. "Computer Graphics Principles And Practice" Second Edition pp 229–283, 332–335, 700–715, 842–845, 1990.*

* cited by examiner

Primary Examiner—Almis R. Jankus
(74) Attorney, Agent, or Firm—Staas & Halsey

(57) ABSTRACT

An apparatus for determining whether polygons which form objects defined by graphic data generated by CAD intersect with virtually generated light rays. Polygons which are not intersected are removed from the graphic data as unnecessary for the generation of CG data. An apparatus is also described in which path passage points which pass through an animation path within a virtual world are interactively set. If an object exists that interferes with a path that joins adjacent path passage points, an alternate route path which detours around the interfering object is generated. An apparatus is also described in which a path of a moving object is interactively set on a perspective view of the virtual world as viewed from one direction. The position of the set path in the virtual world is calculated, and the position of the path in the direction of viewing is corrected to a position that is removed from an object by a prescribed distance.

11 Claims, 27 Drawing Sheets

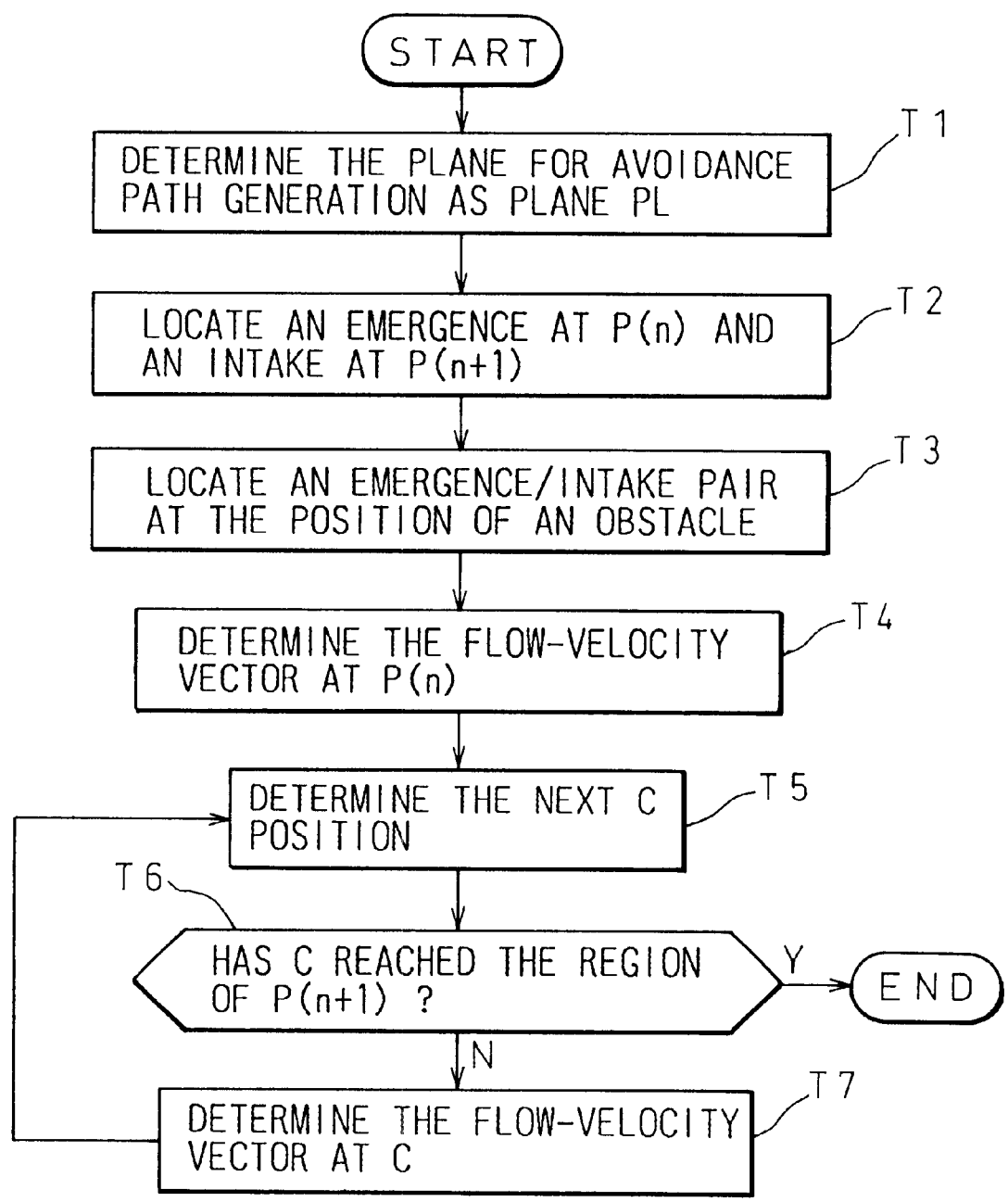

K:LARGE    K:SMALL

STARTING POINT    ENDING POINT

OBJECT TREE          OBJECT LIST

COMPUTER GRAPHICS DATA GENERATING APPARATUS, COMPUTER GRAPHICS ANIMATION EDITING APPARATUS, AND ANIMATION PATH GENERATING APPARATUS

BACKGROUND OF THE INVENTION

1. Field of the Invention

The present invention relates to a CG (computer graphics) data generating apparatus which automatically generates, from CAD (computer aided design) data of objects, CG data (data for generating drawings of computer graphics images) for the objects; a CG animation editing apparatus which uses a CG data generating apparatus to perform high-speed generation of CG animation; and an animation path generating apparatus which generates paths which are used in path animation of computer graphics.

2. Description of Related Art

With recent improvements in animation technology for computer graphics, there has been an increase in the use of what is known as walk-through computer graphics, in which the user within a virtual reality world moves about and can easily experience the virtual reality world. Of this application, use is broadening of what is known as scene simulation, in which the manner in which objects in the virtual world are seen is somewhat limited and the viewing point of the user within this world can be freely moved about. To make this type of CG simulation practical, it is necessary to make it easy to generate CG data of real objects.

In A CG animation editing apparatus which executes editing processing of CG animation, CG data of an object is generated, and then CG animation of the object is generated based on this data. Because the job of generating the CG data from the beginning is very difficult, and because it is difficult to generate realistic-looking objects, plotting data generated using CAD (computer aided design) has recently been used. Because this CAD plotting data is generated for the purpose of manufacturing, it has many parts which are not required for display, such as plotting data elements (polygons) for parts of the object that cannot be seen, and detailed shapes of objects at a distance.

However, the generation of CG animation requires such things as judgments with regard to the intersection of the plotting data and the line of view, calculation of illumination at vertices of the plotting data, and judgments of intersections of light rays with plotting data, for the purpose of applying shadows, the amount of calculations being greater the more numerous are the plotting data elements. Therefore, the use of plotting data generated using CAD as is results in a significant drop in computer graphics drawing speed.

When using CAD plotting data in the generation of CG data, it is necessary to remove the unwanted parts from the CAD plotting data. For example, because a box made using 6 sheets is generated in CAD using 36 (6×6) square polygons, whereas in computer graphics this can be represented by 6 square polygons that can be seen from the outside, it is necessary to remove the unwanted parts from the CAD plotting data when generating CG data from this CAD plotting data.

With regard to this requirement, in the past the practice has been to first use the CAD plotting data as is to make a conversion to CG form, the user then viewing the resulting CG image, predicting which polygons are likely to be unnecessary, and extracting the unnecessary parts from the CAD plotting data. That is, in the past, the method used was that of manual removal by the user of unnecessary parts from the CAD plotting data.

However, in the past when polygons unnecessary for CG animation were manually selected and removed using visual observation, the first problems existed with regard to presenting user with an unavoidably large work load. In addition, as new CAD plotting data was added, it was necessary to manually select and remove the unnecessary parts from the newly added plotting data.

One important application of computer graphics, as noted above, is the creation of graphics which have an effective impact in presenting a user the situation of moving about within a virtual world created by means of computer graphics. For example, in the field of architecture, computer graphics are used to allow the user to walk through a CG-generated building before it is constructed and to verify harmony with the surrounding environment, and in driver education it is possible for a student to drive through a CG-generated course. These applications have made path animation, in which the viewing point or object is moved through a pre-established path, an important technology.

In path animation in the past, the user was made to set the points through which the past passed for each frame (for each time), linear interpolation between the path points being used to set the path of the viewing point or an object.

This path point setting must in actuality be done by specifying positions as 3-axis coordinates. In the past, the path point setting method used was that of using three drawing views, the coordinate positions in the forward path of movement being set using a setting screen viewed from the top, and the height-direction coordinate positions being set from a setting screen viewed from the side. For example, in the case of generating a path animation in which a bird is caused to move, the path points are set in consideration of the forward-direction movement and height movement of the bird, so that the bird does not collide with either the ground or buildings.

In this manner, in the past the method used was that of having the user manually specify 3-dimensional coordinates to set the points through which the path passes, thus generating the paths of the viewing point or objects.

However, in following this type of technology of the past, if an obstacle exists, to avoid this object, because the user must specify a large number of path points in the form of 3-dimensional coordinate positions, not only does the task of performing the setting of path passage points become an extremely troublesome one, but also a large memory capacity is required.

With the technology of the past, it is necessary to generate the paths for objects and viewing points beforehand, and because these cannot be dynamically created, if the condition of an obstacle changes, it can be impossible to avoid the obstacle. Additionally, in the case in which a number of objects are moving simultaneously, it is necessary to consider the relationship between the objects.

Because of the above problems, in practice in the past, it has been necessary to perform several tests, setting the paths while verifying the relationship between the objects, this making the path generating task extremely time-consuming, which is the second problem involved with the technology of the past.

SUMMARY OF THE INVENTION

The present invention was made in view of the above-noted situation, and has as an object the provision of a CG data generating apparatus which is capable of automatically generating CG data for an object from CAD data of the object, and the provision of a CG animation editing apparatus which is capable of using the above-noted CG data generating apparatus to generate CG animation at a high speed.

A second object of the present invention is the provision of an animation path generating apparatus which can generate both automatically and dynamically a path which avoids an obstacle.

A third object of the present invention is the provision of an animation path generating apparatus which can both automatically and dynamically a final three-dimensional path by just the specification of a planar path.

According to the present invention, a CG data generating apparatus is provided which generates CG data for a CG screen from CAD data that is generated by CAD to define a virtual object made up of polygons, this CG data generating apparatus having a light ray generating/intersecting judgment section which virtually generates and aims at an object defined by CD data a plurality of light rays and which makes a judgment as to whether or not each of the light rays intersects with the polygons which make up the object, and a data deleting section which, eliminates, from the CAD data, data with respect to a polygon for which the judgment of the light ray generating/intersecting judgment section is that none of the light rays intersect therewith, thereby generating CG data.

According to the present invention, a CG animation editing apparatus is provided which generates CG animation of an object from CAD data that is generated by CAD to define a corresponding virtual object made up of polygons, this CG animation editing apparatus having a light ray generating/intersecting judgment section which virtually generates and aims at an object defined by CD data a plurality of light rays and which makes a judgment as to whether or not each of the light rays intersects with the polygons which make up the object, a data deleting section which eliminates from the CAD data, data with respect to a polygon for which the judgment of the light ray generating/ intersecting judgment section is that none of the light rays intersect therewith, thereby generating CG data which is suitable for the generation of a computer graphics image, and a CG animation generating section which generates CG animation by using the CG data generated by the data deleting section.

According to the present invention, an animation path generating apparatus is provided, this animation path generating apparatus having means for interactively setting a plurality of points through which a path passes within a virtual space inside which an object exists, means for judging, when a path which joins adjacent path points is set, whether or not there exists an object which interferes, either directly or indirectly, with the path to be set, means for setting a path which joins the above-noted adjacent points when the means for judging the existence of an interfering object judges that such a interfering objects does not exist, and means for automatically setting an alternate route path between the above-noted adjacent points when the means for judging the existence of an interfering object judges that such a interfering objects does exist.

According to the present invention, a path animation generating apparatus is provided, this path animation generating apparatus having means for interactively inputting a path of a moving object within a perspective view as seen from a selected direction in a virtual space in which an object exists, means for calculating the position in the virtual space of a path set by the path input means, means for correcting the positions of a path at each time, which are calculated by the position calculation means, to positions which are removed from the object by a prescribed distance along parallel lines which pass through those positions in the above-noted selected direction.

BRIEF DESCRIPTION OF THE DRAWINGS

The present invention will be more clearly understood from the description as set forth below, with reference being made to the accompanying drawings, wherein

FIG. 17 is a flowchart of another example of avoidance path generation processing;

DESCRIPTION OF PREFERRED EMBODIMENTS

The preferred embodiments of the present invention will be described below in detail, with reference being made to the relevant accompanying drawings.

Figure 1:
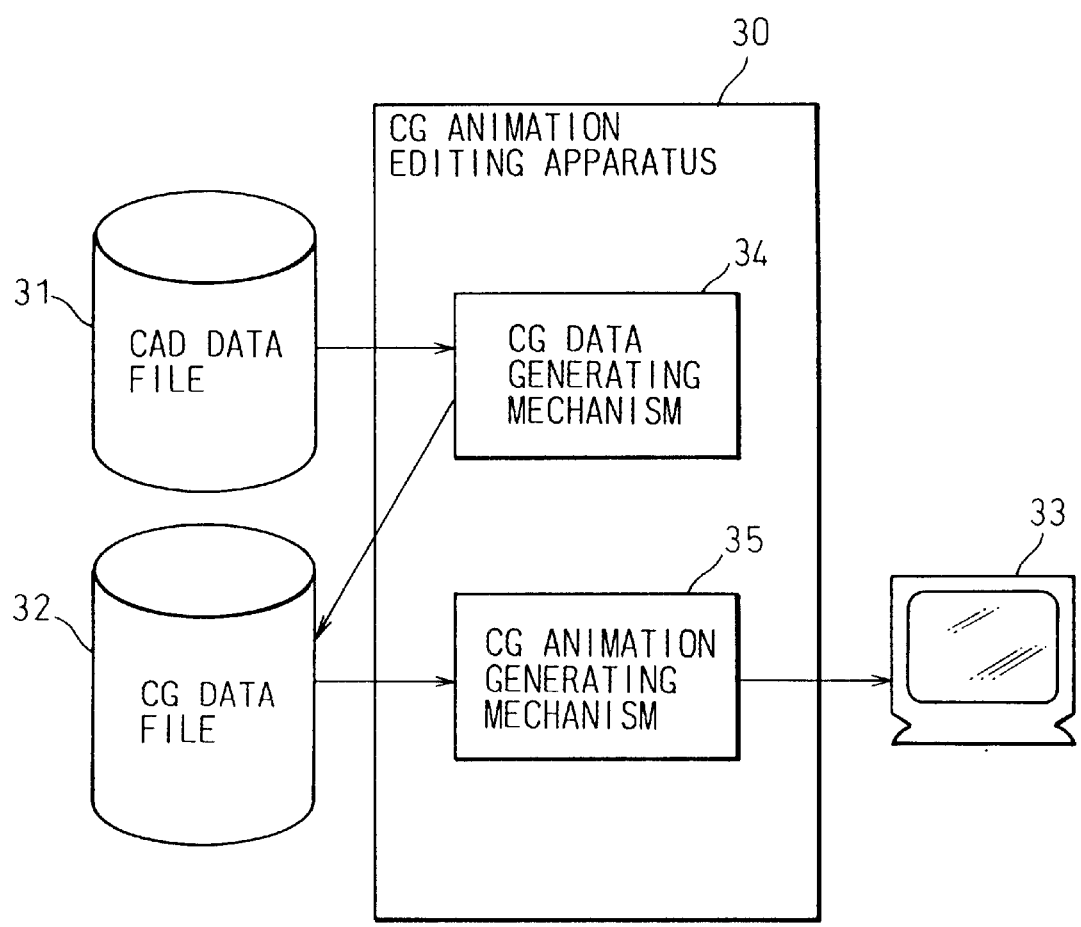
FIG. 1 is a drawing which shows the system configuration of a CG animation editing system according to the present invention.

FIG. 1 is a drawing which shows the system configuration of a CG animation editing system according to an embodiment of the present invention. In this drawing, reference numeral 30 denotes a CG animation editing apparatus, 31 is a CAD data file into which is stored CAD data for an object that is generated on a CAD system (not shown in the drawing), 32 is a CG data file into which is stored CG data for the generation of computer graphics, and 33 is a display which displays CG animation that is generated by the CG animation editing apparatus 30.

The CG animation editing apparatus 30 is implemented by, for example, a personal computer or workstation, and has a CG data generating mechanism 34 which generates CG data of an object from CAD data of the object stored in a CAD data file 31 and which stores this CG data into a CG data file 32, and a CG animation generating mechanism 35 which uses the CG data of an object, which is stored in the CG data file 32, to generate a CG animation and display it on the display 33.

Figure 2:
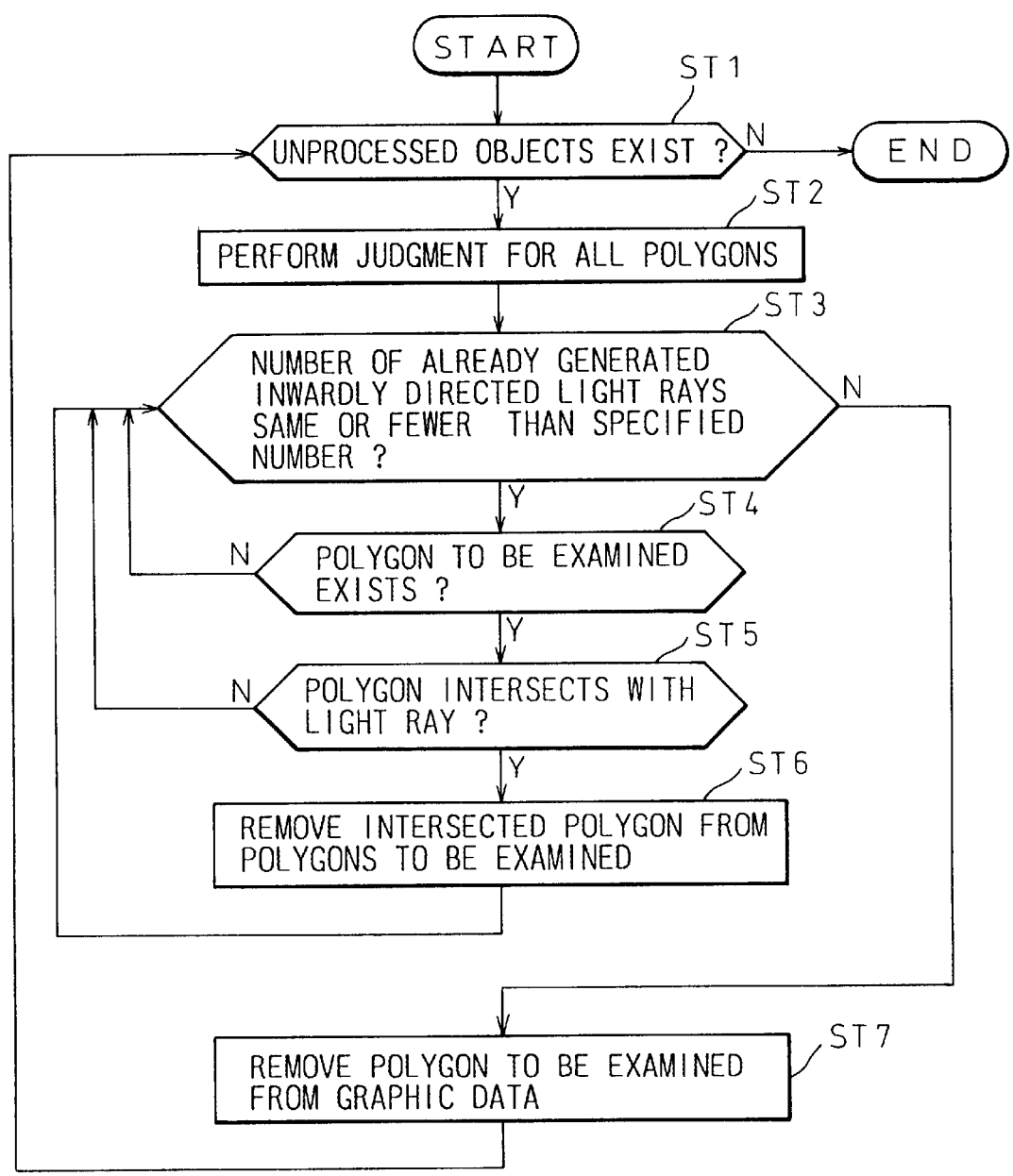
FIG. 2 is a flowchart which shows an example of the flow of processing in a CG data generating mechanism.

FIG. 2 is a drawing which shows an embodiment of the processing flow which is executed by the CG generating mechanism 34 of a CG animation editing apparatus 30. This processing flow will be described below, with regard to the processing for generating CG data according to the present invention.

When CG data is generated in accordance with the processing flow shown in FIG. 2, the CG data generating mechanism 34 first, at step 1, tests whether or not the processing with respect to all objects stored in the CAD data file 31 has been completed. If the results of this test are that the processing for all objects has been completed, all processing is ended. If, however, the judgment is made that unprocessed objects remain, control proceeds to step 2, at which one of the remaining unprocessed objects is selected as an object to be processed, all the polygons that this object has been specified as polygons to be tested.

Figure 3:
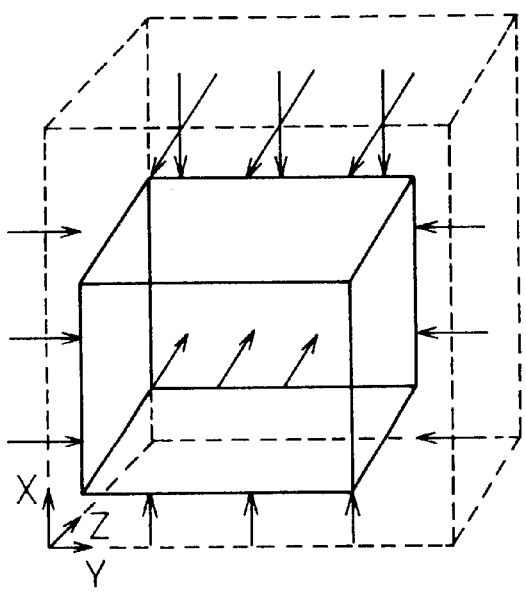
FIG. 3 is a drawing which illustrates the direction of a generated light ray.

Next, at step 3, a test is made to determine whether or not the number of light rays that have already been generated has reached a specified number. If the judgment is that the specified number has not yet been reached, one more virtual light ray is generated from outside the object pointing toward the inside of the object. The form of the generation of this light ray is implemented, as shown in FIG. 3, by successively generating light rays which are parallel to the ±XYZ axes in the object's modeling coordinate system (a separate system for each object), the number of light rays being generated in this manner being established, for example, in accordance with the cross-sectional area of the object in that direction. Because information with regard to the bounding box of the object is stored in the CAD data, it is possible to determine the cross-sectional area by using this information.

When a light ray aimed at the inside of the object from outside the object is generated at step 3, following this at step 4 a test is made as to whether or not there is a remaining polygon to be examined. If the judgment is that there is no remaining polygon, control returns to step 3. If, however, the judgment is that there is a remaining polygon, control proceeds to step 5, at which point a test is made as to whether or not the remaining polygon to be tested and the light ray generated at step 3 intersect.

At step 5, if the condition in which there is no remaining intersecting polygon is detected, control returns to step 3, but if the existence of an intersecting polygon is detected, control proceeds to step 6, after which the intersecting polygon is removed from the polygons to be examined and control returns to step 3.

At step 3, if the judgment is made that the number of already generated light rays has reached a preset number (including the case in which the judgment is made at step 4 that there is no remaining polygon to be examined), control proceeds to step 7, at which the polygons which remain as polygone which do not intersect with light rays are removed from the CAD data, the data of the remaining polygons being stored in the CG data file 32, after which control returns to step 1 in order to perform the processing of the next object.

The test at step 3 as to whether or not the light ray intersects with a polygon can be performed, for example, in the following manner. The position vector r represents the axis of the light ray, which is represented as a function of the position vector $k_0$ of the initial point, the direction vector k, and the parameter t, as follows.

$$r = kt + k_0 \qquad (1)$$

The parameter values of t at the intersection points of the ray and the planes of each polygon are calculated. Next, a test is made to determine whether or not that intersection point is inside each of the polygons is performed, with the points lying outside the polygon being discarded. If one remaining intersection point exists, a polygon which includes that intersection point is the polygon which intersects with the light ray and, in the case in which a plurality of intersection points remain, the polygon which includes the intersection which has the minimum value of t of these is the polygon which intersects with the light ray. At step 6, even if an intersected polygon is removed from the polygons to be examined, the graphic data for the purpose of performing the examination of intersection is, of course, kept.

In this manner, by executing the processing flow shown in FIG. 2, the CG data generating mechanism 34 generates, with respect to CAD data of an object, a plurality of virtual light rays aimed at the inside of the object from outside the object, thereby identifying and eliminating polygons inside the object which are not in the field of view, in the process of automatically generating CG data from CAD data.

Figure 4:
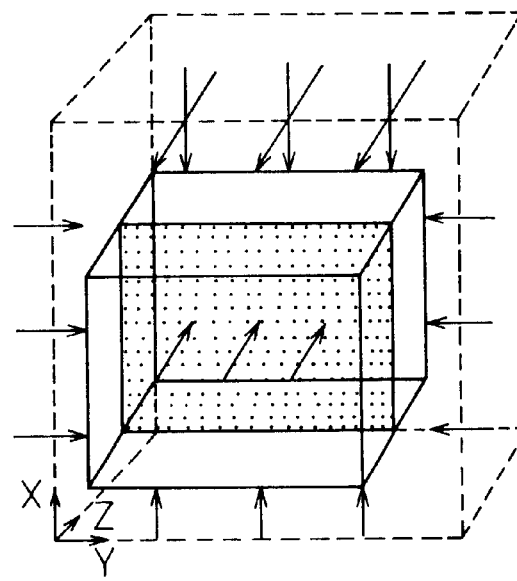
FIG. 4 is a drawing which shows the processing to eliminate an unnecessary polygon.

For example, as shown in FIG. 4, assume the case in which an object exists which is formed by joining together two sheets. Because this object must be represented in CAD data as being formed by joining together two sheets, it is made up of 12 square polygons, whereas as CG data, the two square polygons making contact at the central part are not required. In a case such as this, the CG data generating mechanism 34 executes the processing flow which is shown in FIG. 2, thereby automatically deleting the two square polygons which do not enter the field of view as CG data is generated.

While in the processing flow which is shown in FIG. 2, this assumption is that an object is viewed only from outside, there is a possibility, depending upon the object, that the object will be viewed from within, or be viewed from both outside and within the object.

Figure 5:
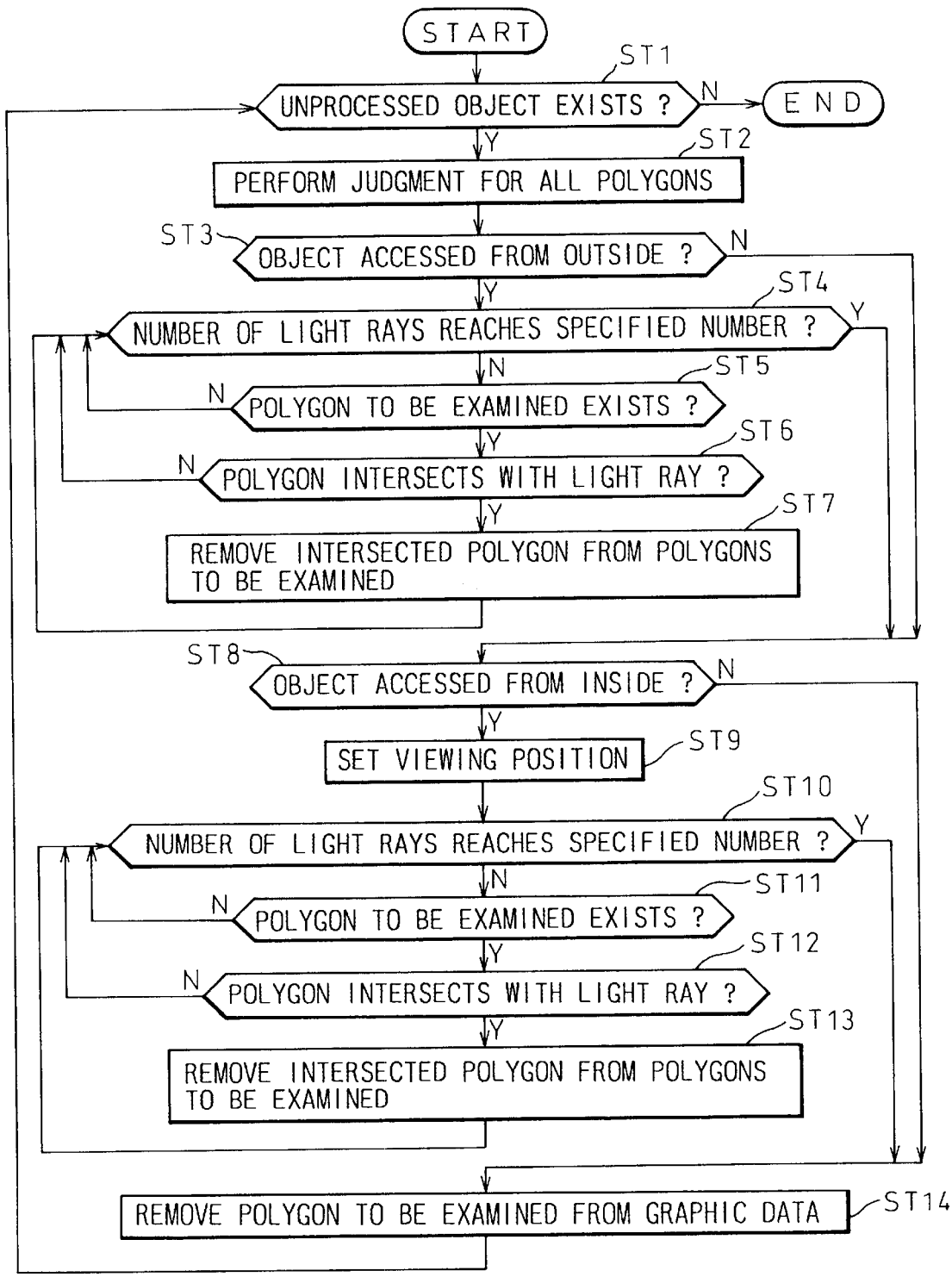
FIG. 5 is a flowchart which shows another example of the flow of processing in a CG data generating mechanism.

FIG. 5 shows an embodiment of the processing flow executed by the CG data generating mechanism 34 in such cases. The CG data generation processing according to the present invention will be described below in detail, according to this processing flow.

At step 1, a test is made to determine whether the processing for all objects stored in the CAD data file 31 has been completed. If the judgment is that processing for all the objects has been completed, all processing is ended. If, however, the judgment is that unprocessed objects remain, control proceeds to step 2, at which one of the remaining unprocessed objects is selected as an object to be processed, all the polygons that this object has being specified as polygons to be examined.

Next, at step 3, a test is made to determine whether or not the object which was selected at step 2 is an object which is accessed from outside. If the judgment is that the object is an object that is accessed from the outside, control proceeds to step 4, at which a test is made to determine whether or not the number of light rays aimed at the inside of the object which have already been generated has reached a specified number. If the judgment is that the specified number has not yet been reached, one more virtual light ray is generated from outside the object pointing toward the inside of the object. For example, as shown in FIG. 3, a light ray is generated which is parallel to the ±XYZ axes of the modeling coordinate system of the object.

After a light ray is generated which is aimed at the inside of the object from outside at step 4, at step 5 a test is made as to whether or not a polygon to be examined remains. If the judgment is that no such polygon remains, control returns to step 4, but if the judgment is that there is such a polygon remaining, control proceeds to step 6, at which a check is made to determine whether or not the remaining polygons to be examined and the light ray which was generated at step 4 intersect.

If the condition in which no intersecting polygon exists is detected at step 6, control returns to step 4, but if the condition in which an intersecting polygon exists is detected, control proceeds to step 7, at which the intersecting polygon is removed from the polygons to be examined, after which control returns to step 4.

If at step 4 the judgment is made that the number of light rays already generated which are aimed at the inside of the object has reached the specified number (including the condition in which at step 5 a judgment is made that there is no remaining polygon to be examined), control proceeds to step 8, at which point a test is made to determine whether or not the object which was selected at step 2 is one that is accessed from within.

At this step 8, if the judgment is made that the object is not an object which is accessed from within, control proceeds to step 14, at which the polygons which remain as polygons which do not intersect with the generated light ray are removed from the CAD data of the object, after which control returns to step 1 for the purpose of generating CG data for the next object. That is, in the case of passing through this route, because the object selected at step 2 is one which is accessed from the outside only, the CG data for the case of viewing the object from the outside of the object is generated and stored in the CG data file 32.

If, however, the judgment is made at step 8 that the object is one which is accessed from within, control proceeds to step 9, at which the setting is made as to the position within the object from which it is viewed. The processing for this setting is made, for example, by generating a wire-frame CG animation (colorless CG animation) from the CAD data for the object, with the user making the setting by entering the object in accordance with that CG animation, it being possible to set not just one, but a plurality of positions.

Figure 6:
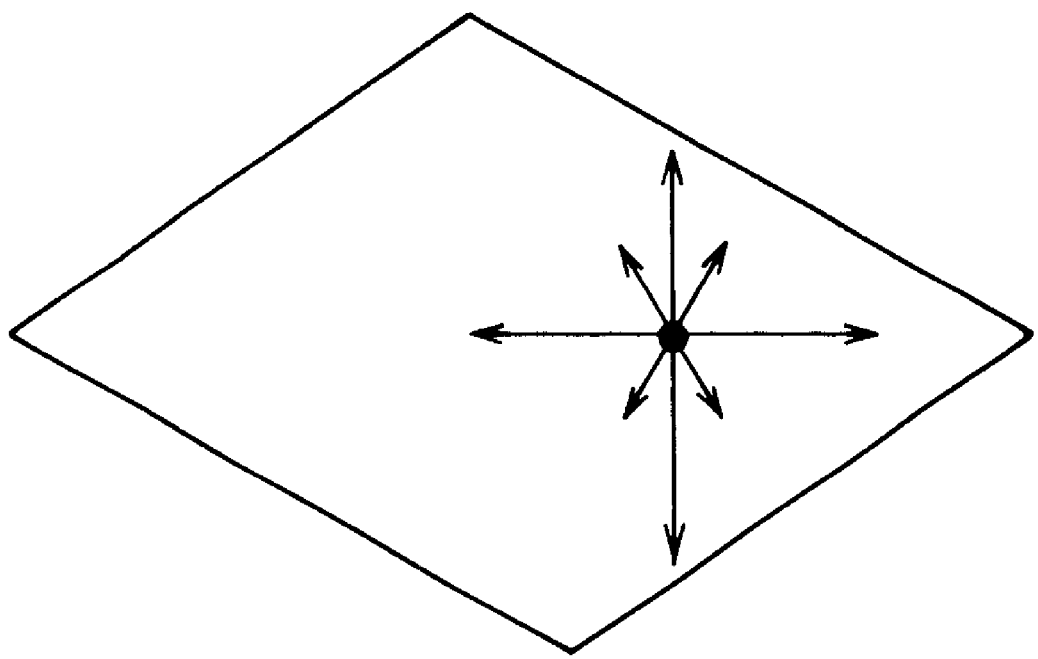
FIG. 6 is a drawing which illustrates the direction of a generated light ray.

Next, at step 10, a test is made to determine whether or not the light rays already generated which aim at the outside of the object have reached a specified number. If the judgment is the specified number has not been reached, one new light ray is generated, with respect to the CAD data of the object, from the internal point set at step 9 as the point of generation. One form of generating this light ray is to generate the light ray so that the light rays generated are as uniform as possible in the space from the point of generation set at step 9, for example as shown in FIG. 6, by generating them radially from the point of generation.

After the light ray aimed toward the outside of the object from within is generated at step 10, at step 11 a test is made to determine whether or not a polygon to be examined remains. If the judgment is that no polygon to be examined remained, control returns to step 10, but if the judgment is that a polygon to be examined remains, control proceeds to step 12, at which a check is made as to whether or not the remaining polygon to be examined and the light ray generated at step 15 intersect.

If the condition in which no intersecting polygon exists is detected at step 12, control returns to step 10, but if the condition in which an intersecting polygon exists is detected, control proceeds to step 13, at which the intersecting polygon is removed from the polygons to be examined, after which control returns to step 15.

If at step 10 the judgment is that the number of light rays already generated which are aimed at the inside of the object has reached the specified number (including the condition in which at step 11 a judgment is made that there is no remaining polygon to be examined), control proceeds to step 14, at which the polygons which remain as polygons which do not intersect with the generated light ray are removed from the CAD data of the object, thereby generating the CG data for the object selected at step 2 and storing this CG data in the CG data file 32, after which control returns to step 1 for the purpose of generating the CG data for the next object. That is, in the case of passing through this route, because the object selected at step 2 is one which is accessed from both the outside and within, the CG data which is usable for the case of viewing the object from both the outside and within is generated and stored in the CG data file 32.

If, however, the judgment is made that the object selected at step 2 is not an object that is accessed from outside, rather than executing the processing of steps 4 through 7, control proceeds to step 8 directly, the processing of steps 9 through 14 being executed, thereby generating the CG data for the case of viewing this object from within and storing this CG data in the CG data file 32, after which control returns to step 1, for the purpose of generating the CG data for the next object. That is, in the case of passing through this route, because the object selected at step 2 is one which is accessed only from within, the CG data which is usable for the case of viewing the object from within is generated and stored in the CG data file 32.

In this manner, by executing the processing flow shown in FIG. 5, the CG data generating mechanism 34 generates, with respect to CAD data of an object which is viewed only from outside, a plurality of virtual light rays aimed at the inside of the object from outside the object, thereby identifying and eliminating polygons inside the object which are not in the field of view in the process of automatically generating CG data, and with respect to CAD data of an object that is viewed only from within, the CG data generating mechanism 34 generates a plurality of virtual light rays which are aimed at the outside of the object from inside the object, thereby identifying and eliminating polygons inside the object which are not in the field of view in the process of automatically generating CG data. Further, in the case of an object that is viewed from both outside and within, the CG data generating mechanism 34 executes the above two processings in series, thereby identifying and eliminating polygons which are not only not in the field of view as viewed from outside, but also not in the field of view when viewed from inside, in the process of automatically generating CG data.

Figure 7:
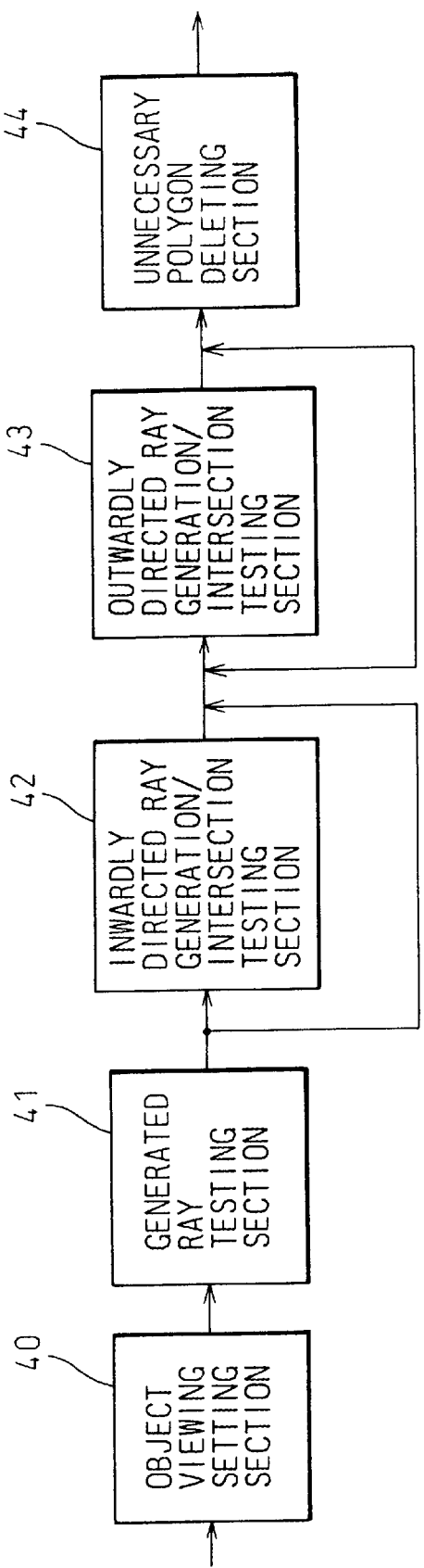
FIG. 7 is a block diagram which shows the configuration of a CG data generating mechanism.

FIG. 7 shows the block diagram configuration of a CG data generating mechanism 34 for the case in which processing follows the processing flow which is shown in FIG. 5.

As shown in this drawing, in the case in which processing follows the processing flow of FIG. 5, the CG data generating mechanism is formed by an object viewing setting section 40, a generated ray testing section 41, an inwardly directed ray generation/intersection testing section 42, an outwardly directed ray generation/intersection testing section 43, and an unnecessary polygon deleting section 44.

By way of a simplified explanation of the functions of the above elements, the object viewing setting section 40 performs setting of the class of viewing of an object which is stored in the CAD data file 31 as an object that the user views from the outside only, views from outside and from within, or views from the inside only, in accordance with the CG walk-through scenario. For an object which is viewed from the within, processing is also performed for positions from which the object is viewed.

The generated ray testing section 41 performs processing which assigns the processing of inwardly directed ray generation/intersection testing section 42 for objects which are viewed from outside only, assigns the processing of outwardly direct ray generation/intersection testing section 43 for objects which are viewed from inside only, and assigns the processing of both the inwardly directed ray generation/intersection testing section 42 and the outwardly direct ray generation/intersection testing section 43 for objects which are viewed from both outside and inside.

The inwardly directed ray generation/intersection testing section 42 causes an appropriate number of rays to be generated in the six directions of front, back, up, down, left, and right, aimed from the outside of an object to the inside, and performs testing of intersection with all polygons. The outwardly directed ray generation/intersection testing section 43 causes an appropriate number of rays to be generated, aimed at the outside from the inside of the object, and performs testing of intersection with all polygons.

The unnecessary polygon deleting section 44 generates CG data by removing from the CAD data polygons which have been judged to be non-interested by the inwardly directed ray generation/intersection testing section 42 and the outwardly direct ray generation/intersection testing section 43.

When the CG data generating mechanism 34 generates CG data in this manner from the CAD data of an object and stores this CG data in the CG data file 32, the CG animation generating mechanism 35 of the CG animation editing apparatus 30 uses this CG data in performing processing to generate a CG animation and display it on the display 33. That is, the CG animation generating mechanism 35, as will be described later, uses the method of generating a perspective view of a virtual world as viewed when moving along an animation path, and of presenting this on the display 33.

In this CG animation generation processing, the processing of objects which are viewed from both outside and inside presents a problem.

In such as case, in the above example, the configuration is such that only polygons which can be seen from neither outside nor inside are removed. However, in doing this because when viewing from outside polygons only viewable from inside are unnecessary and when viewing from inside polygons viewable only from outside are unnecessary, the speed of plotting is reduced.

Because of this problem, in an embodiment of the present invention, the method adopted is that of using a configuration in which, for an object which can be seen from both outside and inside, CG data for the case of the object viewed from outside which is determined by the processing performed by the inwardly directed ray generation/intersection testing section 42 and the unnecessary polygon deleting section 44, and the CG data for the case of the object viewed from the inside which is determined by the processing performed by the outwardly directed ray generation/intersection testing section 43 and the unnecessary polygon deleting section 44 are prepared separately, and when changing the viewing point from outside to inside the object or from inside to outside the object, the CG data used in dynamically switched as the CG animation is being generated.

Figure 8:
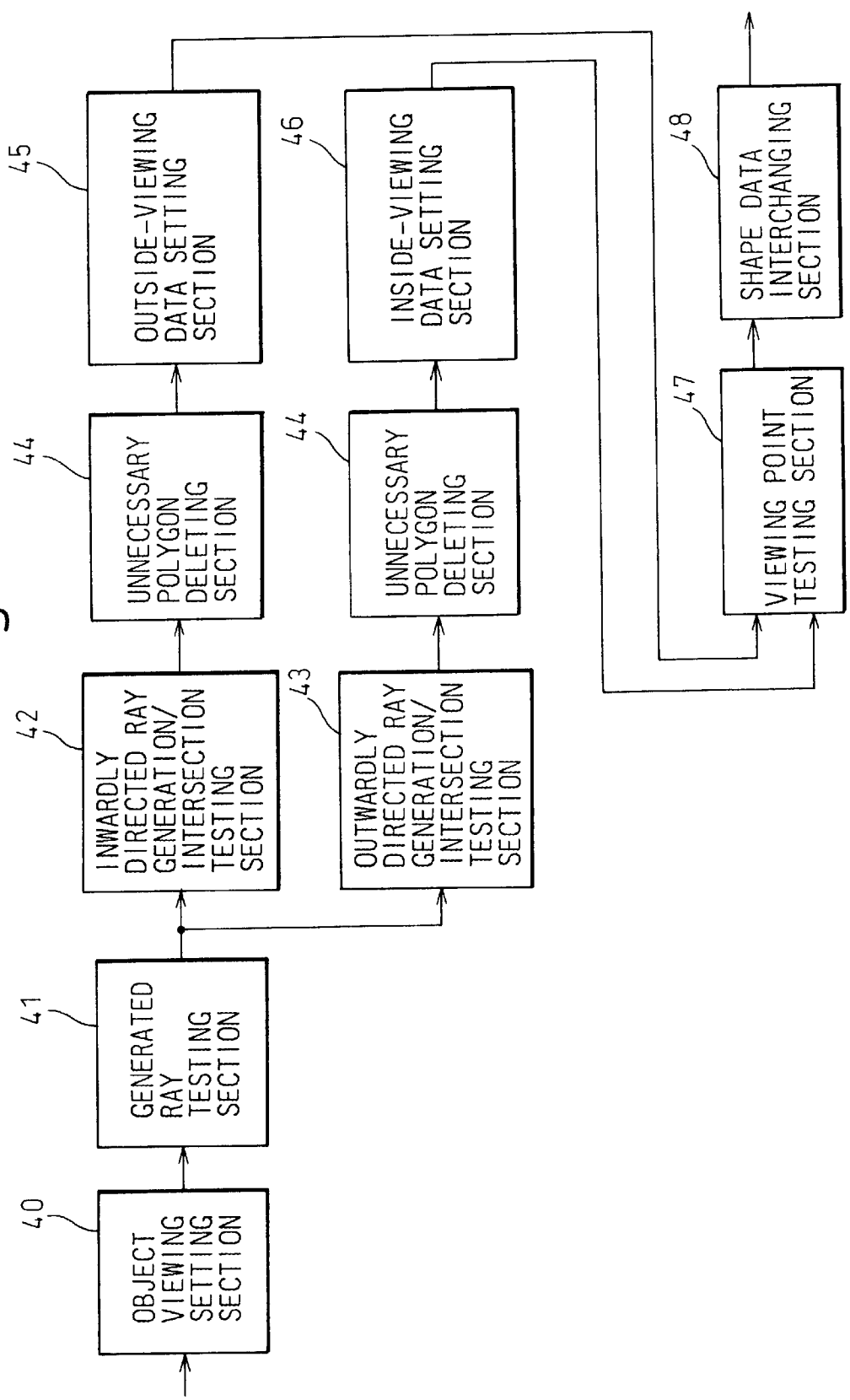
FIG. 8 is a block diagram which shows the configuration of a CG animation editing apparatus.

FIG. 8 shows the block diagram configuration of CG animation editing apparatus 30 in the case of following the above-noted configuration. In this drawing, previously described elements have been assigned the same reference numerals as used previously.

The outside-viewing data setting section 45 shown in this drawing sets CG data of an object which is determined by the processing in the inwardly directed ray generation/testing section 42 and the unnecessary polygon deleting section 44 as the CG data to be used when the viewing point is located outside the object. The inside-viewing data setting section 46 shown in this drawing sets CG data of an object which is determined by the processing in the outwardly directed ray generation/testing section 43 and the unnecessary polygon deleting section 44 as the CG data to be used when the viewing point is located inside the object.

The viewing point testing section 47 performs a test of whether or not, during a walk-through, there is an intersection between the viewing point and an object that is viewed from both outside and inside, thereby determining whether the walk-through is outside or inside the object, so that, for example, if the walk-through is outside and the viewing point and object intersect, the judgment is that the viewing point has entered the inside of the object.

When the viewing point testing section 47 determines that the viewing point has moved from inside an object to outside the object, the shape data interchanging section 48 changes the CG data to be used in generating the CG animation to the CG data which is set by the outside-viewing data setting section 45, and when the viewing point testing section 47 determines that the viewing point has moved from outside an object to inside the object, the shape data interchanging section 48 changes the CG data to be used in generating the CG animation to the CG data which is set by the inside-viewing data setting section 46.

By using the above-noted configuration, it is possible to generate CG animation using CG data having fewer polygons than in the past and in the previously described embodiment.

Figure 9:
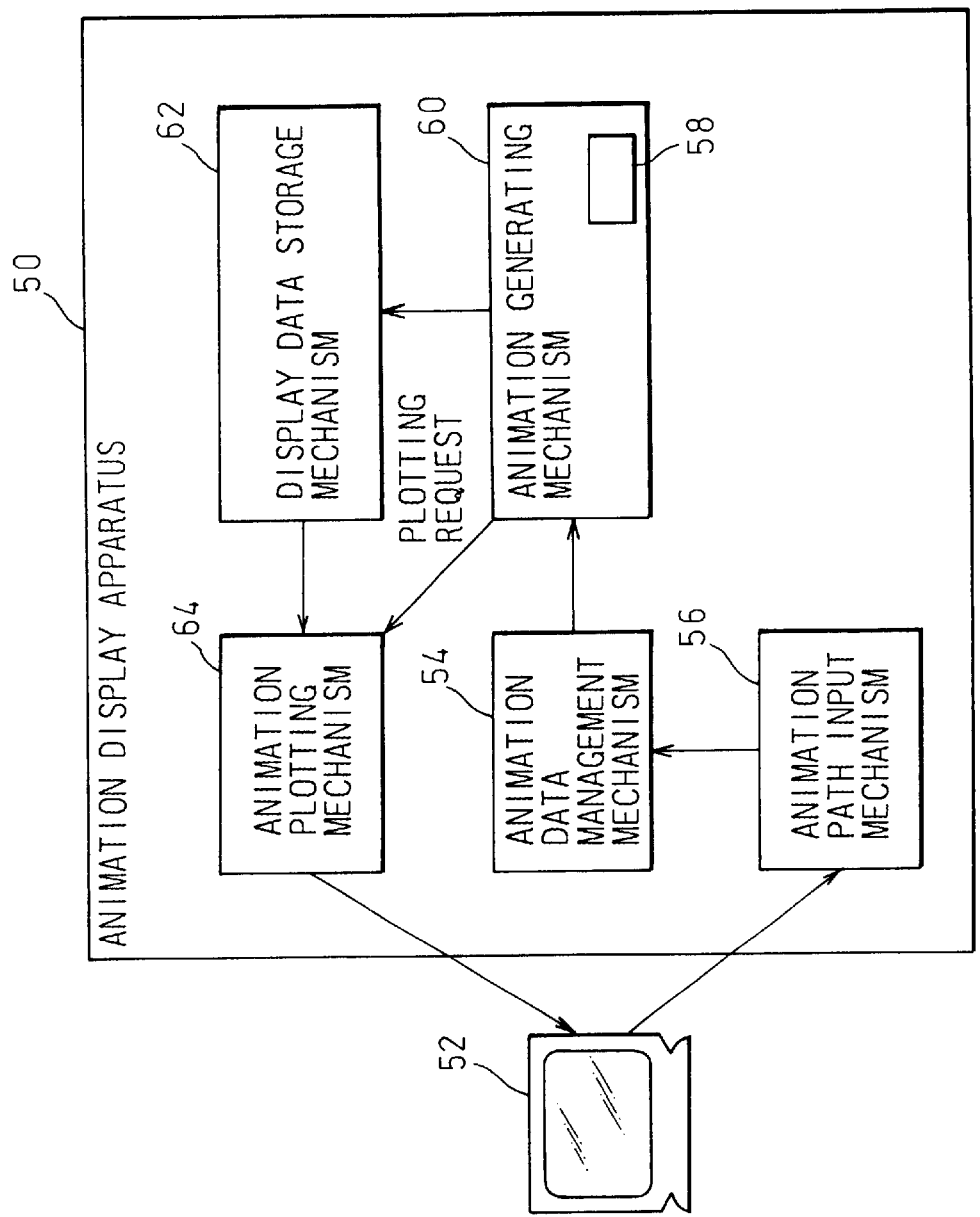
FIG. 9 is a apparatus block diagram which shows the configuration of an animation display apparatus according to the present invention.

FIG. 9 shows the configuration of a second embodiment of an animation display apparatus according to the present invention. In this drawing, the reference numeral 50 denotes an animation display apparatus according to the present invention, which presents a virtual world by means of computer graphics, 52 is a terminal which the animation display apparatus 50 has, which displays a virtual world and serves as a means for interaction with a user.

This animation display apparatus 50 has an animation data management mechanism 54, an animation path input mechanism 56, an animation path generating mechanism 58, an animation generating mechanism 60, a display data storage mechanism 62, and an animation plotting mechanism 64.

The animation data management mechanism 54 manages object data such as the shapes and textures of each object which makes up the virtual world, animation data which represents temporal changes in each of the objects, and information which is required for generation of the animation path. The animation path input mechanism 56 generates, interactively with a user, information which is required in the generation of an animation path, and stores this information in the animation data management mechanism 54.

The animation path generating mechanism 58 is included within the animation generating mechanism 60, and uses the information which is required for generation of an animation path which is managed by the animation data management mechanism 54 to generate an animation path which is used in an animation. The animation generating mechanism 60 uses the animation path which is generated by the animation path generating mechanism 58 and the data managed by the animation data management mechanism to generate an animation by calculating the positions and condition of an object at each time.

The display data storage mechanism 62 has stored in it the animation display data which is generated by the animation generating mechanism 60. The animation plotting mechanism 64 receives plotting instructions from the animation generating mechanism 60, reads out display data from the display data storage mechanism 62, and displays it on a display screen, thereby plotting the animation.

Next, the operation of a first example of an animation display mechanism 50 configured as described above will be described.

In the first example, the animation path input mechanism 56 performs interaction with a user to set the points though which the path passes as 3-dimensional coordinate positions, these being stored as is in the animation data management mechanism 54. The processing to input these path points is performed no differently than in the previous technology which is described above. However, when an interfering object exists along the animation path, the configuration is such that the interfering object is automatically avoided, enabling the user to input the points through which the path passes without the difficulty encountered in the prior art.

Figure 10:
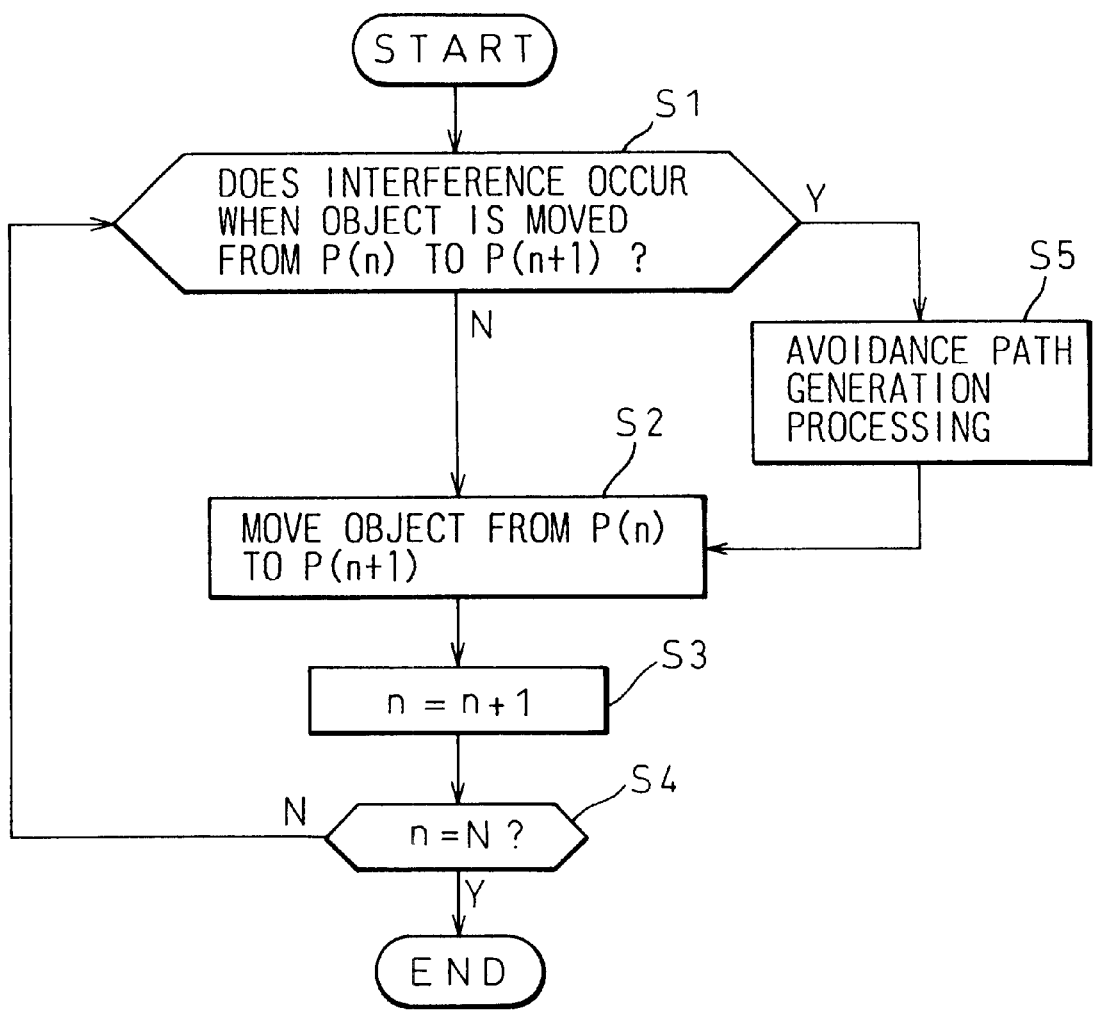
FIG. 10 is a flowchart which shows the flow of processing in an animation path generating mechanism.

The animation path generating mechanism 58 uses the path passage points which are stored in the animation data management mechanism 54 to execute the generation of an animation path. FIG. 10 shows the basic configuration of the processing flow which is executed by this animation path generating mechanism 58

As shown in this processing flow, when the animation path generation is started, for the case of causing an object to be moved from a path passage point P(n) to a path passage point P(n+1), for example directly, the animation path generating mechanism 58 first at step 1 (s1) makes a test as to whether or not there is interference with another object. If the judgment is that there is no interference, control proceeds to step 2 (s2), at which the object is moved from path passage point P(n) to path passage point P(n+1), for example directly.

If, however, the judgment at step 1 (s1) is that there is interference with another object, at step 5 (s5), a path which avoids the obstructing object is successively generated, as the object being moved from path passage point P(n) to path passage point P(n+1) at step 2 (s2).

When the processing at step 2 (s2) is completed, at step 3 the value of the variable n is incremented by 1, after which at step 4 (s4) a test is made to determine whether or not the value of the variable n has reached the final path passage point N. If the judgment is that it has reached that value, the animation path generation processing is ended, but if the judgment is that value has not been reached, return in made to step 1 (s1).

Figure 11:
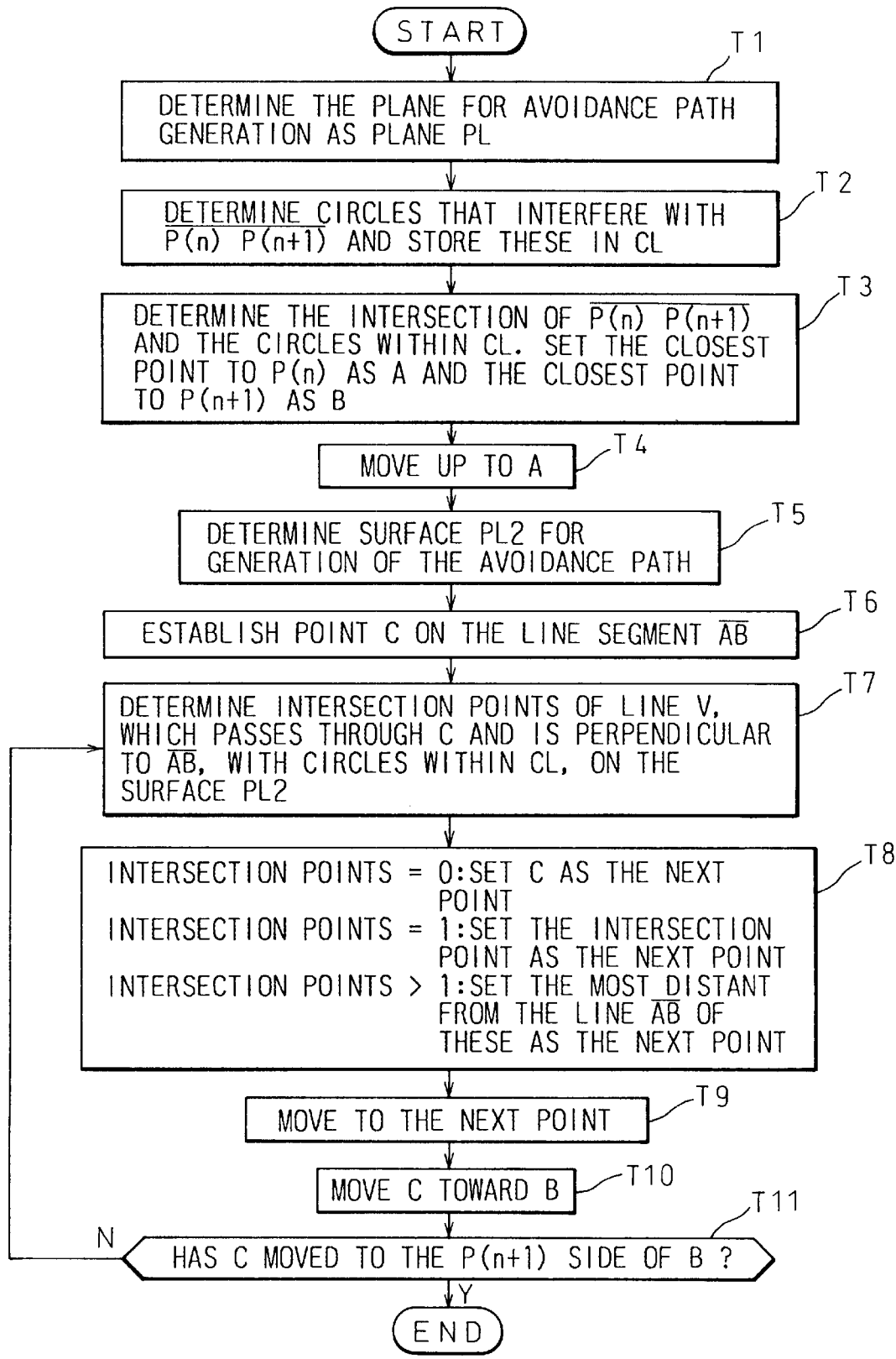
FIG. 11 is a flowchart which shows an example of the flow of processing for avoidance path generation.

FIG. 11 shows the flow of the avoidance path generation processing at step 5 (s5) in FIG. 10 and the flow of the movement processing at step 2 (s2) along the generated avoidance path.

Following this processing flow, first at step 1 (t1) the animation path generating mechanism 58 establishes a plane PL, for example one which includes the points P(n−1), P(n) and P(n+1), for generation of an avoidance path, onto which the path passage points P(n) and P(n+1) are placed. Next, at step 2 (t2), the bounding spheres which include the other objects are sliced by the plane PL to determine bounding circles, within which bounding circles which interfere with a straight line joining the path passage point P(n) the path passage point P(n+1), that is, bounding circles which interfere directly, are determined, and further bounding circles are determined which interfere with these, that is, which interfere indirectly, are determined, these being stored in a bounding circle list CL.

Figure 12:
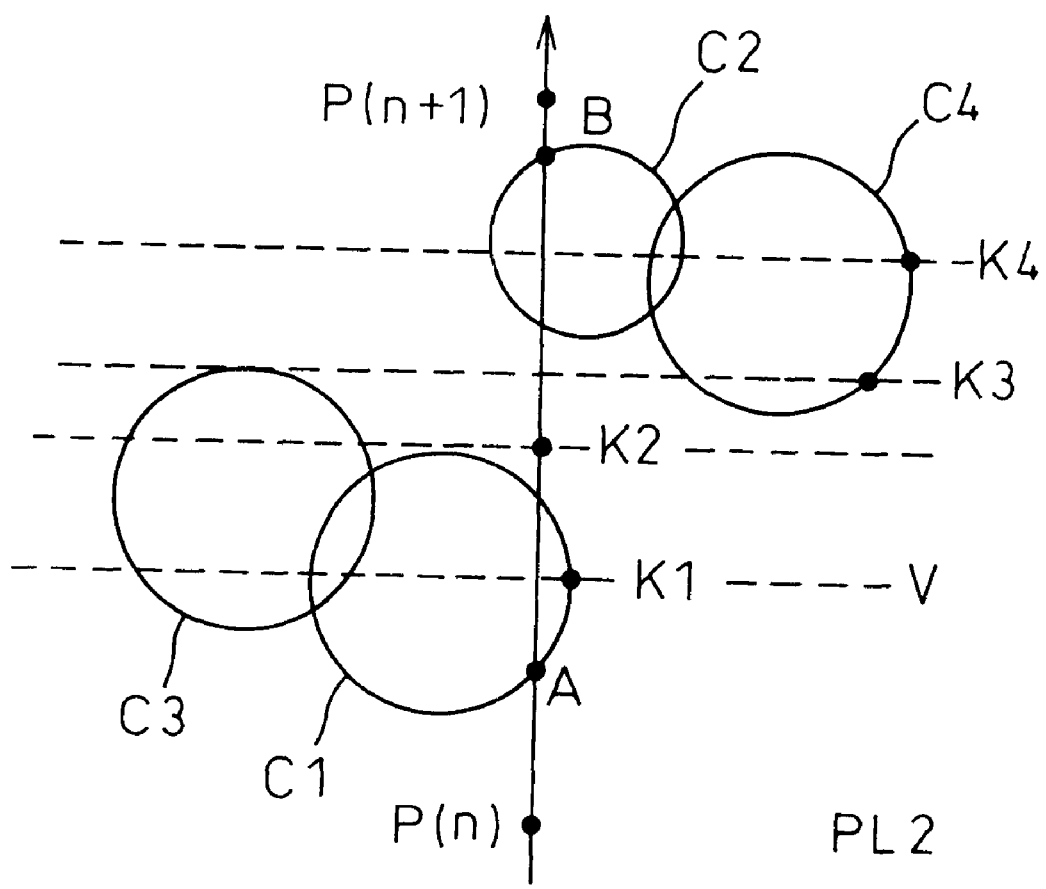
FIG. 12 is a drawing which illustrates the processing for avoidance path generation.

With regard to the example shown in FIG. 12, in addition to determining bounding circles C1 and C2 which interfere with a straight line that joins the path passage point P(n) and the path passage point P(n+1), the bounding circles C3 and C4 which interfere with these are determined, and these bounding circles C1, C2, C3, and C4 are stored in the bounding circle list CL.

Next, at step 3 (t3), intersection points of the straight line which joins the path passage point P(n) and the path passage point P(n+1) with the bounding circles which are stored in the bounding circle list are determined, and of these points, the point A which is closest to the path passage point P(n) and the point B which is closest to the path passage point P(n+1) are also determined.

Then, at step 4 (t4), the object to be moved is moved from the path passage point P(n) to the point A. Next, at step 5 (t5), of the two surfaces which are formed by dividing the surface PL by the straight line which joins the path passage point P(n) and the path passage point P(n+1), the surface PL2 for the generation of the avoidance path is determined.

The processing for this determination can be implemented by the user making a specification such as the right side, and can also be implemented by a configuration in which the system automatically selects the surface in accordance with the definition as the surface with few bounding circles.

Next, at step 6 (t6), the point C is set in the region of point A on the line segment AB. Then at step 7 (t7), the intersection points of a straight line V which not only passes through point C but also is perpendicular with a line that joins points A and B and positioned on the PL plane with the bounding circles which are stored in the bounding circle list PL are determined, ones of these which are located on the surface PL2 being identified.

Then, at step 8 (t8), if the judgment made is that the number of intersecting points identified at step 7 is zero, a "next point" is set at point C position, if the number of identified points is 1 the "next point" is set at the identified point position, and if the number of identified points is greater than 1, "the next point" is set at the position of the point of these identified intersection points which is the greatest distance from the line which joins points A and B.

Next, at step 9 (t9), the object to be moved is moved to the "next point" which was set at step 8. Then, at step 10 (t10), the point C is moved towards point B along the line segment AB, and at step 11 (t11) a test is made as to whether or not the point C has exceeded the path passage point P(n+1). If the judgment is made that it has done so, the processing is ended. If, however, the judgment is made that the path passage point P(n+1) has not yet been exceeded, control returns to step 7.

In this manner, described with regard to FIG. 12, the avoidance path from the path passage point P(n) and then through the sequence of points A, K1, K2, K3, K4, B, and finally the path passage point P(n+1) is automatically generated, passing to the right side of the bounding circles C1, C2, and C4.

Following the processing flow shown in FIG. 11, the animation path generating mechanism 58 uses relatively simple bounding circles to generate an animation path which avoids interfering objects, thus providing the advantage of high-speed generation of an avoidance path.

Figure 13:
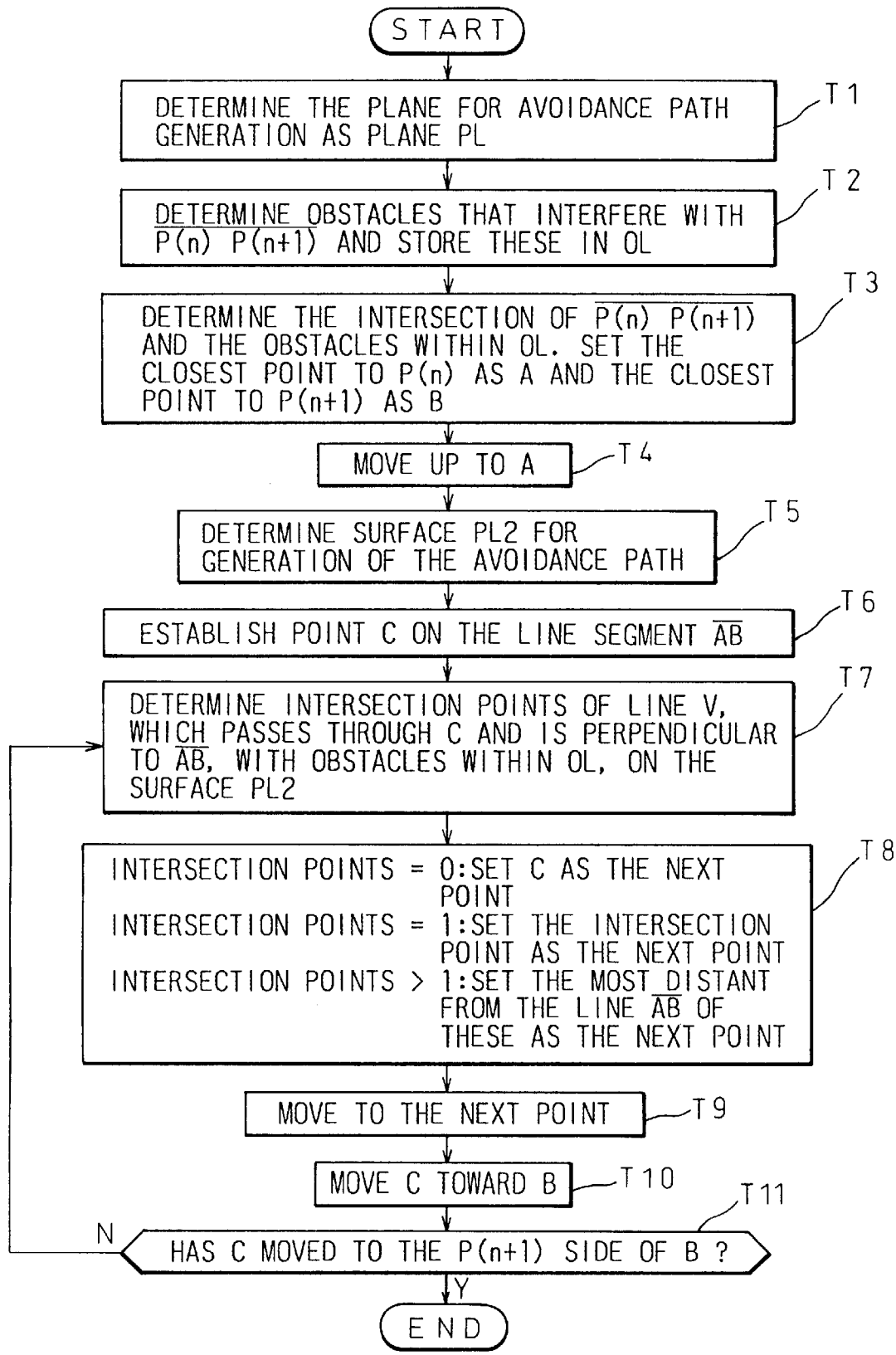
FIG. 13 is a flowchart of another example of avoidance path generation processing.

FIG. 13 shows another processing flow for generation of an avoidance path and the processing of movement therealong which is executed by the animation path generation mechanism 58.

Following this processing flow, first at step 1 (t1) the animation path generating mechanism 58 establishes a plane PL, for example one which includes the points P(n−1), P(n) and P(n+1), for generation of an avoidance path, onto which the path passage points P(n) and P(n+1) are placed. Next, at step 2 (t2), cross sections are determined by slicing the other objects, and of these cross sections which interfere with a straight line joining the path passage P(n) and the path passage point P(n+1) are determined, and further cross sections which interfere with these are determined these being stored in an obstacle list OL.

Figure 14:
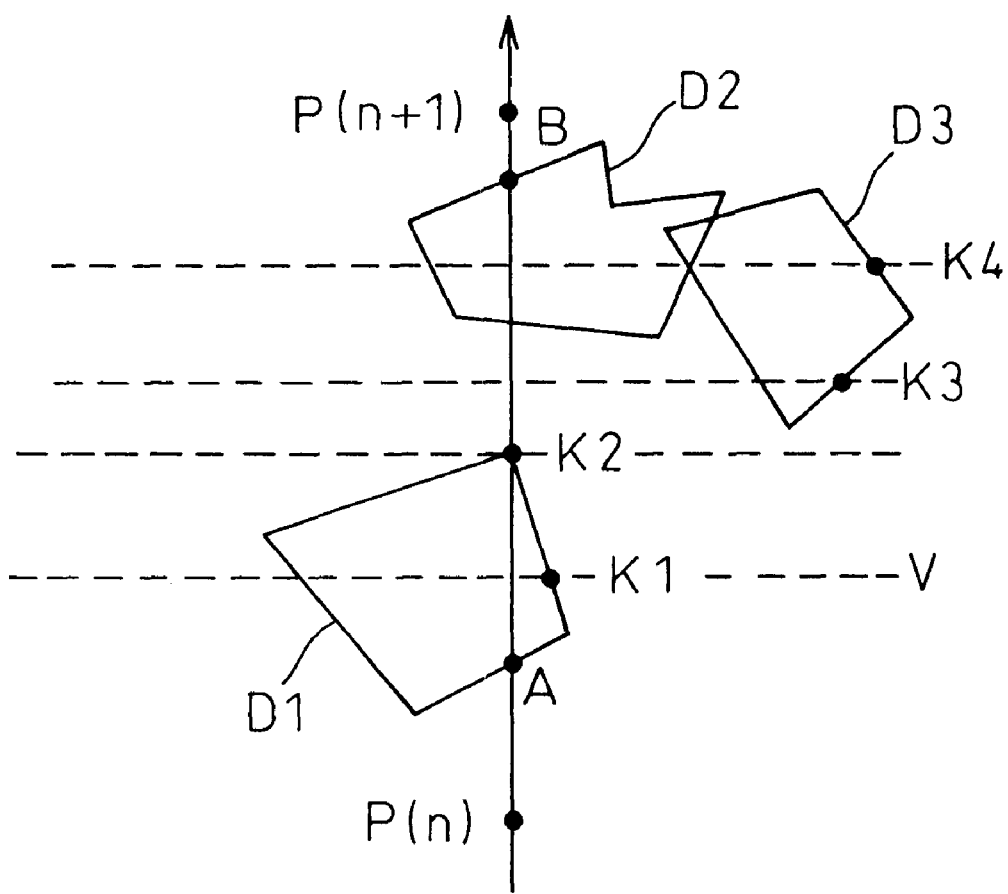
FIG. 14 is a drawing which illustrates the processing for avoidance path generation.

Explained in terms of the example shown in FIG. 14, in addition to determining the cross sections D1 and D2 of the obstacle which interfere with a straight line which joins the path passage point P(n) and the path passage point P(n+1), the cross section D3 of the obstacle which interferes with these is determined, these cross sections D1, D2, and D3 being stored in the obstacle list OL.

Next, at step 3 (t3), the points of intersection between the straight line which joins the path passage point P(n) and the path passage point P(n+1) and the cross sections which are stored in the obstacle list OL are determined, and of these the point A which is closest to the path passage point P(n) and the point B which is the closest to the path passage point P(n+1) are determined.

Then, at step 4 (t4), the object to be moved is moved from path passage point P(n) to point A. Next, at step 5 (t5) of two surfaces which are formed by dividing the surface PL by the straight line which joins the path passage point P(n) and the path passage point P(n+1), the surface PL2 for the generation of the avoidance path is determined. The processing for this determination can be implemented by the user making a specification such as the right side, and can also be implemented by a configuration in which the system automatically selects the surface in accordance with the definition as the surface with few cross sections.

Next, at step 6 (t6), the point C is set in the region of point A on the line segment AB. Then at step 7 (t7), the intersection points of a straight line V which not only passes through point C but also is perpendicular to a line that joins points A and B and located on the plane PL with the cross sections which are stored in the obstacle list OL are determined, ones of these which are located on the surface PL2 being identified.

Then, at step 8 (t8), if the judgment made is that the number of intersecting points identified at step 7 is zero, a "next point" is set at the current point C position, if the number of identified points is 1 the "next point" is set at the identified point position, and if the number of identified points is greater than 1, the "next point" is set at the position of the point of these identified intersection points which is the greatest distance from the line which joins points A and B.

Next, at the step 9 (t9), the object to be moved is moved to the "next point" which was set at step 8. Then, at step 10 (t10), the point C is moved towards point B along the line segment AB, and at step 11 (t11) a test is made as to whether or not the point C has exceeded the path passage point P(n+1). If the judgment is made that it has done so, the processing is ended. If, however, the judgment is made that the path passage P(n+1) has not yet been exceeded, control returns to step 7.

In this manner, as described with regard to FIG. 14, the avoidance path from the path passage point p(n) and then through the sequence of points A, K1, K2, K3, K4, B, and finally the path passage point (P(n+1) is automatically generated, passing to the right side of the cross-section D1, D2, and D4.

Following the processing flow shown in FIG. 13, the animation path generating mechanism 58 uses the shape of obstacles to generate an animation path which avoids interfering objects, thus providing the advantage of being able to generate a realistic avoidance path which follows the variations in height representing the shapes of obstacles.

Figure 15:
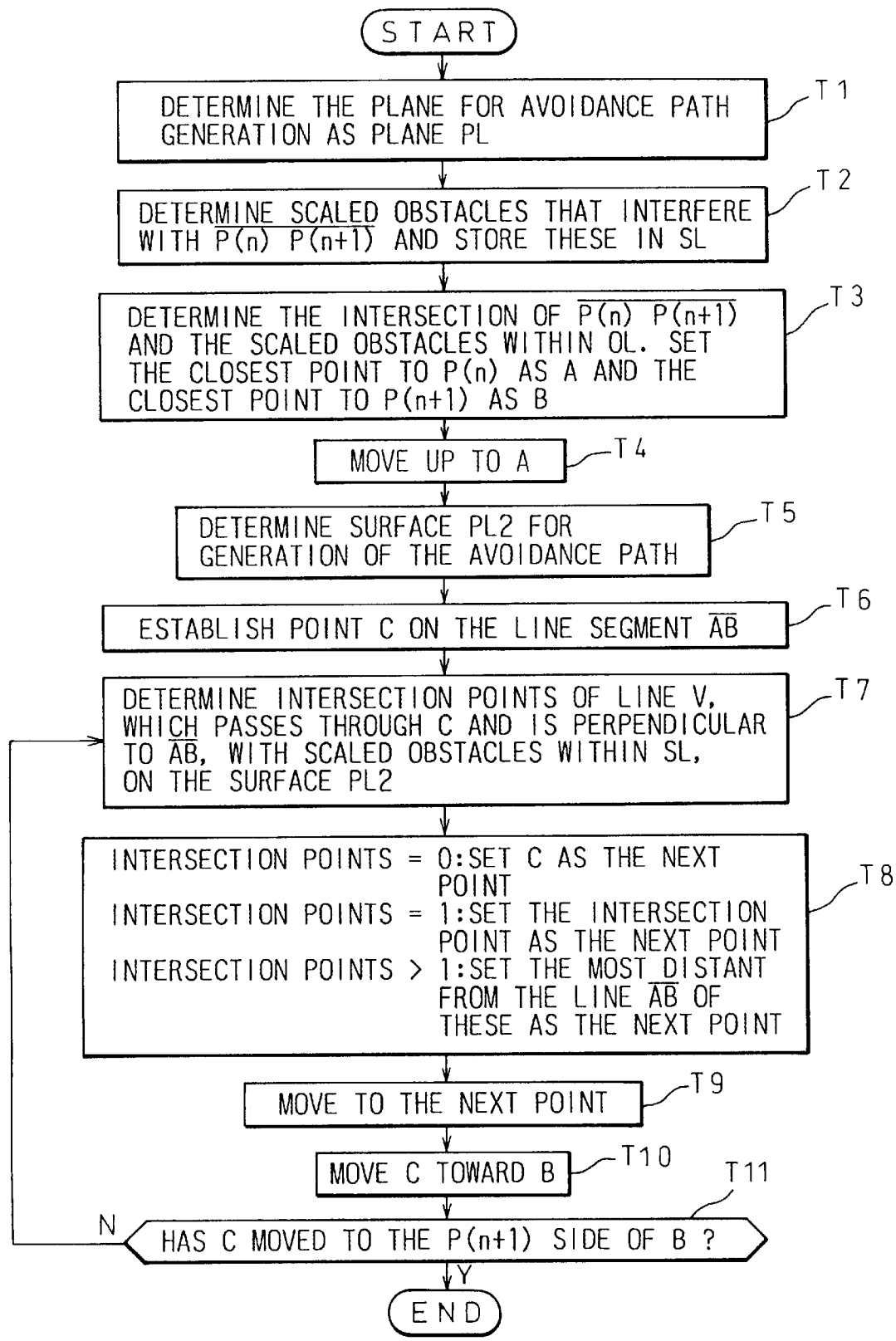
FIG. 15 is a flowchart of another example of avoidance path generation processing.

FIG. 15 shows another processing flow for generation of an avoidance path and the processing of movement therealong which is executed by the animation path generation mechanism 58.

Following this processing flow, first at step 1 (t1) the animation path generating mechanism 58 establishes a plane PL, for example one which includes the points P(n−1), P(n) and P(n+1), for generation of an avoidance path, onto which the path passage points P(n) and P(n+1) are placed. Next, at step 2 (t2), cross sections are determined by slicing the other objects, these then being scaled by a multiple of, for example, 1.2, and of these scaled cross sections, scaled cross sections which interfere with a straight line joining the path passage point P(n) and the path passage point P(n+1) are determined, and further scaled cross sections which interfere with these are determined, these being stored in an obstacle list SL.

Figure 16:
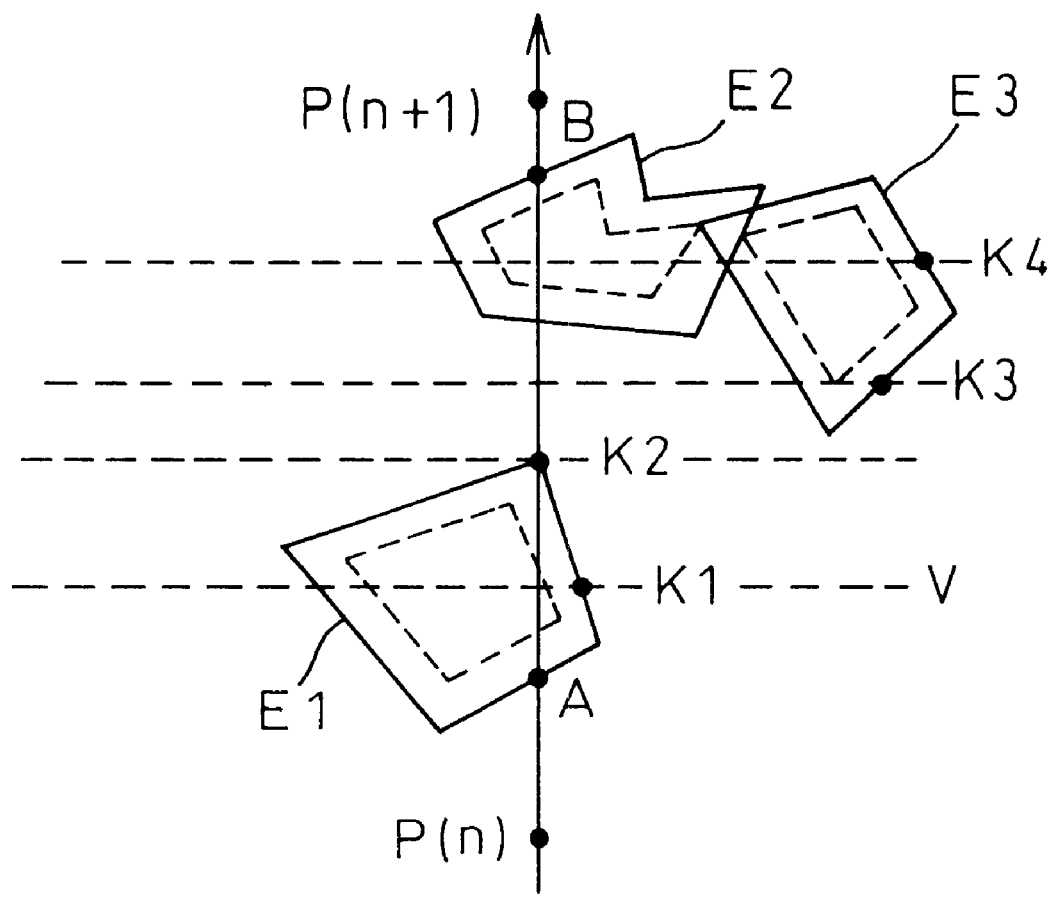
FIG. 16 is a drawing which illustrates the processing for avoidance path generation.

Explained in terms of the example shown in FIG. 16, in addition to determining the scaled cross section E1 and E2 which interfere with a straight line which joines the path passage point P(n) and the path passage point P(n+1), the scaled cross section E3 of the obstacle which interferes with these is determined, these scaled cross sections E1, E2, and E3 being stored in the obstacle list SL. The broken lines in FIG. 16 are the obstacle cross sections before scaling.

Next, at step 3 (t3), the points of intersection between the straight line which joins the path passage point P(n) and the path passage point P(n+1) and the scaled cross sections which are stored in the obstacle list SL are determined, and of these the point A which is closest to the path passage point P(n) and the point B which is the closest to the path passage point P(n+1) are determined.

Then, at step 4 (t4), the object to be moved is moved from path passage point P(n) to point A. Next, at step 5 (t5) of two surfaces which are formed by dividing the surface PL by the straight line which joins the path passage point P(n) and the path passage point P(n+1), the surface PL2 for the generation of the avoidance path is determined. The processing for this determination can be implemented by the user making a specification such as the right side, and can also be implemented by a configuration in which the system automatically selects the surface in accordance with the definition as the surface with few scaled cross sections.

Next, at step 6 (t6), the point C is set in the region of point A on the line segment AB. Then at step 7 (t7), the intersection points of a straight line V which not only passes through point C but also is perpendicular with a line that joins A and B and located on the plane PL with the scaled cross sections which are stored in the obstacle list SL are determined, ones of these which are located on the surface PL2 being identified.

Then, at step 8 (t8), if the judgment made is that the number of intersecting points identified at step 7 is zero, a "next point" is set at the current point C position, if the number of identified points is 1 the "next point" is set at the identified point position, and if the number of identified points is greater than 1, the "next point" is set at the position of the point of these identified intersection points which is the greatest distance from the line which joins points A and B.

Next, at step 9 (t9), the object to be moved is moved to the "next point" which was set at step 8. Then, at step 10 (t10), the point C is moved towards point B along the line segment AB, and at step 11 (t11) a test is made as to whether or not the point C has exceeded the path passages point P(n+1). If the judgment is made that it has done so, the processing is ended. If, however, the judgment is made that the path passage point P(n+1) has not yet been exceeded, control returns to step 7.

In this manner, described with regard to FIG. 16, the avoidance path from the path passage point P(n) and then through the sequence of points A, K1, K2, K3, K4, B, and finally the path passage point P(n+1) is automatically generated, passing by the scaled cross sections E1, E2, and E3.

Following the processing flow shown in FIG. 15, the animation path generating mechanism 58 uses the expanded shape of obstacles to generate an animation path which avoids interfering objects, thus providing the advantage of being able to generate an avoidance path which provides a feeling of avoiding obstacles while walking about which is close to that experienced in the real world.

FIG. 17 shows another processing flow for generation of an avoidance path which is executed by the animation path generation mechanism 58.

This example uses a flow-velocity field, and generates an avoidance path which joins the path passage point P(n) with the path passage point P(n+1). Following the processing flow, first at step 1 (t1) the animation path generating mechanism 58 establishes a plane PL, for example one which includes the points P(n−1), P(n) and P(n+1), for generation of an avoidance path, onto which the path passage points P(n) and P(n+1) are placed. Next, at step 2 (t2), an emergence point is positioned at the path passage point P(n) and an intake point is positioned at the path passage point P(n+1).

Next, at step 3 (t3), cross sections are determined by slicing the other objects with the plane PL, those cross sections which interfere with a straight line which joins path passage point P(n) and path passage point P(n+1) being determined, along with cross sections which interfere with these, and among the positions of these obstacles (interfering objects), an emergence point is positioned at the position that is the closest to the path passage point P(n), and the intake point is positioned at the position is closest to the path passage point P(n+1), these two points forming an emergence-intake pair.

Figure 18A:
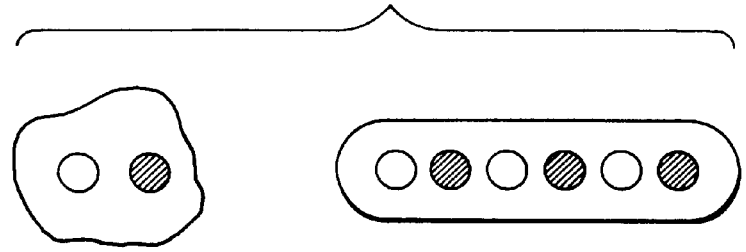
FIGS. 18A and 18B are drawings which illustrate emergence and intake.
Figure 18B:

These emergence and intake points which form a pair are used to represent an obstacle as a fluid dynamics equivalent and, as shown in FIG. 18A, an obstacle is equivalently represented by a number of pairs having an equal intensity, the number of pairs being responsive to the size of the cross section of the obstacle. As shown in FIG. 18B, it is also possible to position a pair having intensities which are responsive to the size of the cross section of the obstacle.

Figure 19:
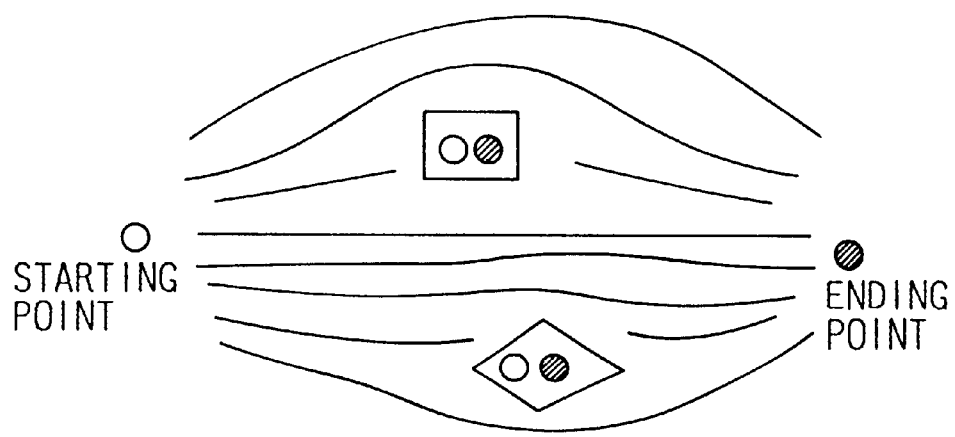
FIG. 19 is a drawing which illustrates avoidance path generation processing.

By doing this, it is possible, as shown in FIG. 19, to form a flow-velocity field between the path passage point P(n) which is a starting point and the path passage point P(n+1) which is the ending point, in accordance with known principles of fluid dynamics, which avoids the obstacle, this field being equivalently represented by an emergence-intake point pair. In the drawing, the plain circle represents an emergence point, while the black-filled circle represents an intake point.

The flow velocity Ux in the X direction and the flow velocity Uy in the Y direction observed at any arbitrary point within the field is known from fluid dynamics to be derivable as follows.

$$Ux = \sum_i \frac{K_i}{r_i} \cos\theta_i \quad (2)$$

$$Uy = \sum_i \frac{K_i}{r_i} \sin\theta_i \quad (3)$$

Figure 20:
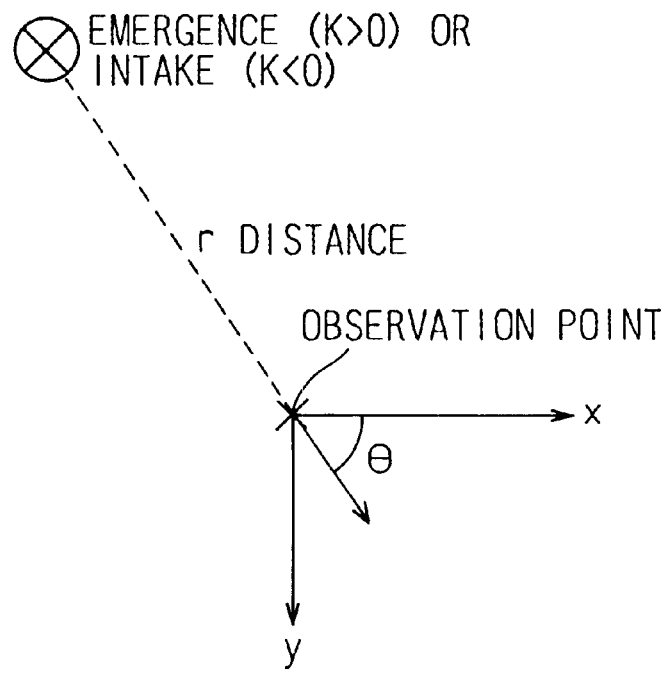
FIG. 20 is a drawing which illustrates the derivation of flow-velocity vectors.

In the above relationships, $r_i$ is the distance of each emergence/intake point from the observation point, $K_i$ is the intensity of each emergence/intake point, and $\theta_i$ is the angle formed between the observation point and each emergence/intake point, these being illustrated in FIG. 20.

The above are used to form a flow-velocity field, after which at step 4 (t4) the velocity vectors are determined at the path passage point P(n), according to the above equations. Then, at step 5 (t5), the position C on plane PL which is taken as the next observation point is determined from these velocity vectors at path passage point P(n) and the time step.

Next, at step 6 (t6), a test is made as to whether or not the position C has reached the path passage point P(n+1). If the judgment is made that it has reached this point, processing is ended. If, however, the judgment is that it has not reached the path passage point P(n+1), control proceeds to step 7 (t7), at which the velocity vectors at that position C are determined in accordance with equations (1) and (2), after which control returns to step 5. The time step used at step 5 can be given beforehand by a user, or established by using the amount of time required for the previous frame processing.

In this manner, described in terms of the example shown in FIG. 19, an avoidance path is automatically generated from the path passage point P(n), which is the starting point in the drawing, to the path passage point P(n+1), which is the ending point in the drawing.

The advantage of following the processing flow shown in FIG. 19 is that, the path passage point P(n), which is the starting point and the path passage point P(n+1), which is the ending point, are given, the animation path generating mechanisms 58 can automatically generate on avoidance path, even if intermediate path passage points in the path are unknown, thereby not only greatly reducing the work of generating an avoidance path, but also greatly reducing the amount of memory required for avoidance path generation.

Furthermore, in the processing flow shown in FIG. 19, while a plane PL for generation of an avoidance path, and which passes through the path passage point P(n) and the path passage point P(n+1) is established, a flow-velocity field being formed on this plane PL to generate an avoidance path which joins the path passage point P(n) and the path passage point P(n+1), it is also possible, without using the plane PL, to use a flow-velocity field, and to generate an avoidance path in accordance with 3-dimensional processing.

Figure 21:
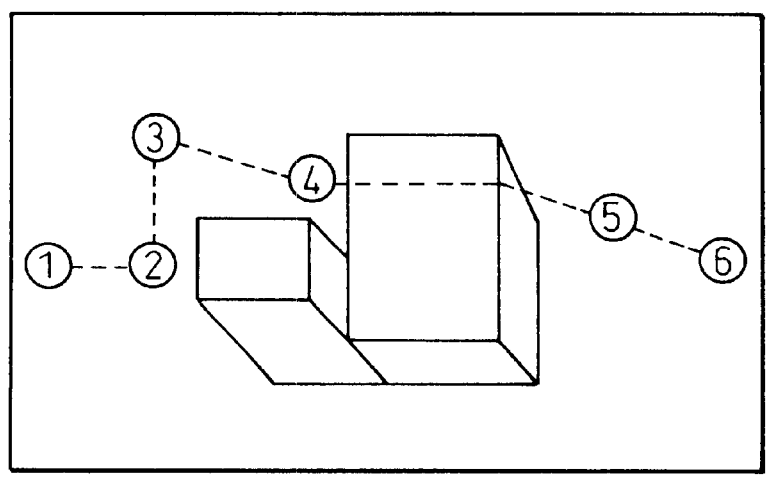
FIG. 21 is a drawing which illustrates an animation path input mechanism.

Next, another embodiment of the present invention will be described. In this embodiment of the present invention, the animation path input mechanism 56 of FIG. 9 first interacts with a user to establish the viewing direction in the virtual world, and to set the path passage points in the perspective view of the virtual world when viewing is done in that set direction, thereby setting the animation path of a moving object. For example, as shown in FIG. 21, with a plane that intersects the direction of the pull of gravity perpendicularly selected as the projection plane, by setting path passage points indicated by <1> through <6> on a screen onto which the virtual world is projected, an animation path of a moving object or viewing point (hereinafter referred to as a moving body) is set.

The orientation of the projection plane used in the setting of this animation path can be selected, for example, as a plane which is parallel to the direction of the force of gravity.

After the animation path input mechanism 56 sets a planar animation path as described above, the position in the virtual world of the thus-set planar animation path is calculated, this position being stored in the animation data management mechanism 30. For example, because a point $(x_w, y_w)$ set on a 2-dimensional projection has in a 3-dimensional virtual world the 3-dimensional coordinates $(x_c, y_c, z_c)$, the position in this virtual world is calculated.

Specifically, this calculation processing is performed by the following procedure.

Figure 22:
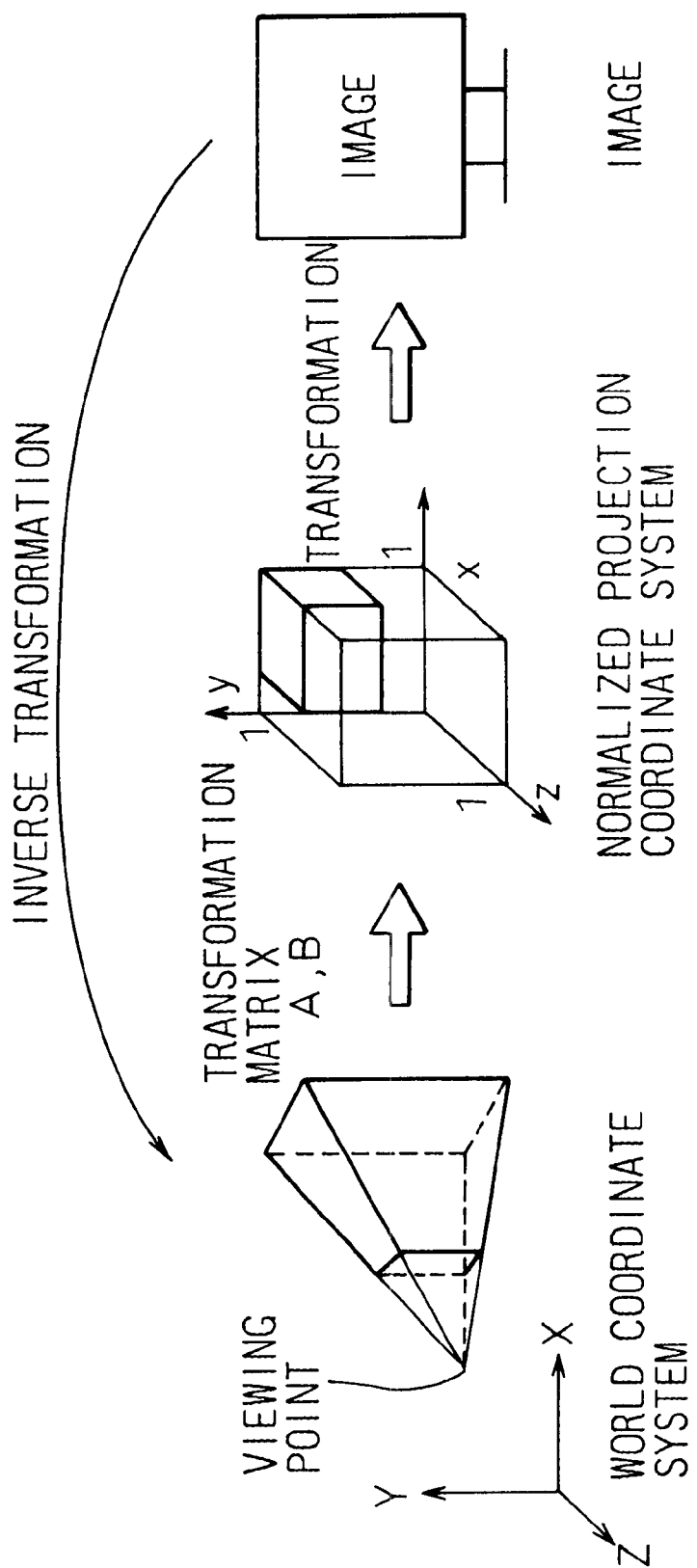
FIG. 22 is a drawing which illustrates an animation path input mechanism.

As shown in FIG. 22, the coordinates $x_c$, $y_c$, and $z_c$ in the world coordinate system are converted to the normalized projection coordinate system coordinate values $x_n$, $y_n$, and $z_n$ by means of the following equation (4).

$$\begin{pmatrix} x_n \\ y_n \\ z_n \\ 1 \end{pmatrix} = AB \begin{pmatrix} x_c \\ y_c \\ z_c \\ 1 \end{pmatrix} \quad (4)$$

In the above, the matrix B is a 4-row 4-column view orientation conversion matrix which performs conversion from the world coordinate system to the viewing reference coordinate system, and matrix A is a 4-row 4-column view mapping matrix which performs conversion from the viewing reference coordinate system to the normalized projection coordinate system. The view orientation conversion matrix B is the product of the matrix for shifting of the origin from the origin of the world coordinate system to the origin of the viewing reference coordinate system, a matrix which rotates the coordinates about the Y axis of the world coordinate system by the viewing axis direction angle $\alpha$, and a matrix which rotates the coordinates about the X axis of the world coordinate system by the viewing axis elevation angle $\beta$.

The view map matrix A is a matrix which expands or reduces the coordinates in X-axis and Y-axis directions, in proportion to the distance from the viewing point.

From equation (4), we have the following relationship.

$$\begin{pmatrix} x_c \\ y_c \\ z_c \\ 1 \end{pmatrix} = (AB)^{-1} \begin{pmatrix} x_n \\ y_n \\ z_n \\ 1 \end{pmatrix} \quad (5)$$

If into the $x_n$ and $y_n$ of equation (5) are substituted, respectively, the coordinates $x_w$ and $y_w$ of the path passage points set on the projection plane, and into $z_n$ of this equation is substituted provisionally the maximum value Zmax, the coordinate values $x_c$, $y_c$, and $z_c$ in the world coordinate system of the path passage point which are set in the perspective view in the virtual world are calculated. In this relationship, $z_c$ is a provisional value, while the values of $x_c$ and $y_c$ are values based on settings made by a user.

In this manner the animation path input mechanism 56 performs interaction with the user so that selection is made of the direction of projection for the perspective view for the purpose of setting the animation path, and by setting path passage points in this perspective view, a planar animation path of an object which moves is set, the position of this animation path in the virtual world being calculated, and this being stored in the animation data management mechanism 54.

Figure 23:
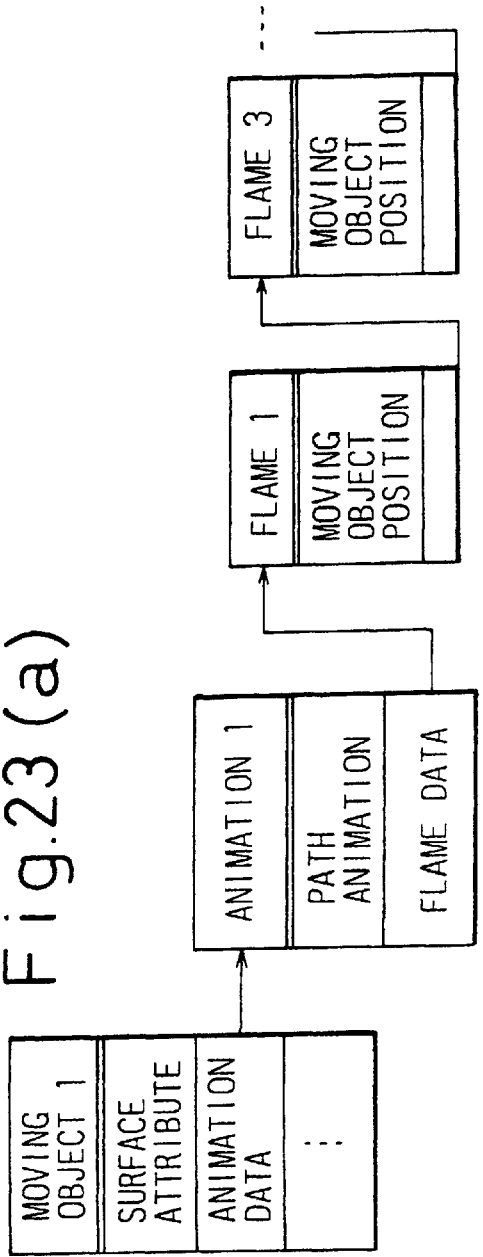
FIGS. 23(a–c) are drawings which illustrate path information which is stored in an animation data management mechanism.
Figure 23:
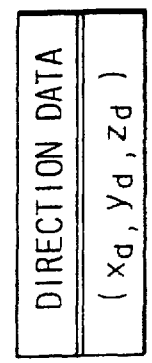
Figure 23:
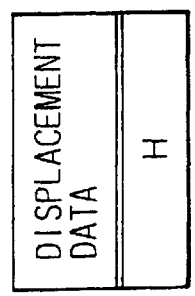

FIG. 23 shows an example of path information stored in the animation data management mechanism 54 in accordance with processing by the animation path input mechanism 56.

As shown in this drawing, in addition to storing, as shown at (a), the animation path position information $x_c$, $y_c$ for example, for the moving object position (path passage point) in the first frame and the moving object position in the third frame, as shown at (b) in this drawing, in setting this animation path, there is storage of the normal direction vector data (viewing axis) of the plane selected by the animation path input mechanism 56. In addition to this information, there is storage of displacement data H (to be described later), which is used as the basis for establishing the position of the moving body in the normal direction, which was not established at the animation path input mechanism 56. This displacement data H can be defined in the system or set by the user.

The animation path generating mechanism 58 uses this path information which is stored in the animation data management mechanism 54 in executing the generation of the final animation path, and the animation generating mechanism 60 uses the thus-created animation path in generating an animation and storing it in the display data storage mechanism 62, so that processing is done to present a display on the display screen.

Figure 24:
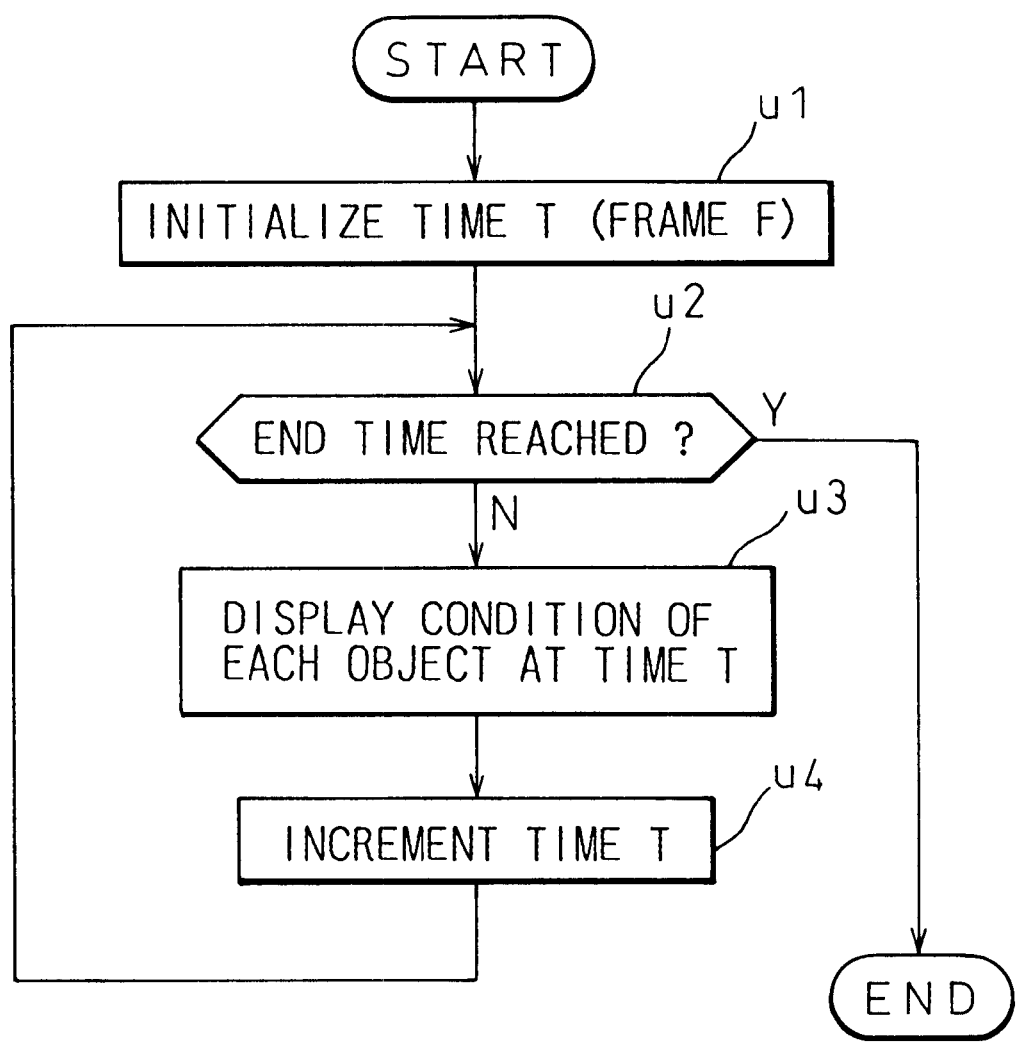
FIG. 24 is a flowchart which shows the flow of processing in an animation generation mechanism.

Specifically, the animation generating mechanism 60, as shown in the processing flow shown in FIG. 24, initializes the starting time of the animation at step 1 (u1), after which at step 2 (u2) it makes a test as to whether or not the time is the ending time of the animation. If the judgment is that the ending time has been reached, processing is ended. If, however, the judgment is that the ending time has not been reached, control proceeds to step 3 (u3), at which the condition of each object at time T is calculated and stored in the display data storage mechanism 62 while referencing of the animation path generated by the animation path generating mechanism 58, thereby causing a display on the display screen, after which at step 4 (u4) the time T is incremented and control returns to step 2, from which the above processing is repeated. It should be noted that the viewing axis for the purpose of display in this processing is not necessarily parallel with the viewing axis for the purpose of display of the screen for setting the path passage points.

Figure 25:
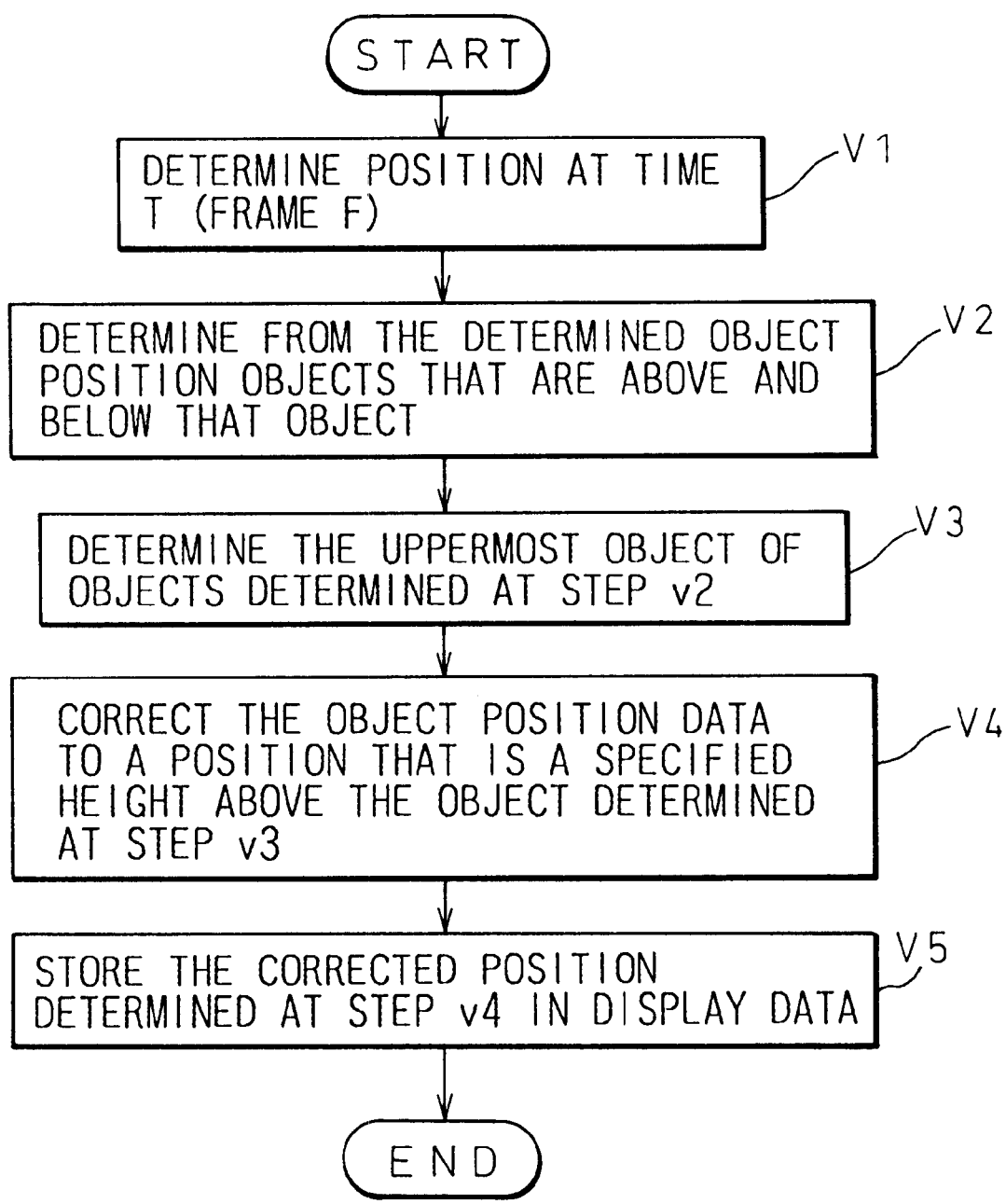
FIG. 25 is a flowchart which shows an example of the flow of processing in an animation path generating mechanism.

FIG. 25 shows an example of the animation path generation processing flow which is executed by the animation path generating mechanism 58. In this processing flow, the user selects a plane which perpendicularly intersects with the direction of the force of gravity as the projection plane, the assumption being made that the animation path set is of a moving object in a perspective view projected onto that plane. That is, the direction data indicated in FIG. 23 represents the direction of the force of gravity, and the displacement data H indicated in FIG. 23 is used for the purpose of setting the path position of the direction of the force of gravity, which is not established at the animation path input mechanism 56.

As shown by this processing flow, when the animation path generating mechanism 58 generates the animation path, first at step 1 (v1), it calculates the position of the moving object at the time T set by the animation generating mechanism 60, in accordance with management data of the animation data management mechanism 54. As shown in FIG. 23, because the animation data management mechanism 54 has stored in it positions of a moving object at discrete times (frames) set by the user, when the position of a moving body at time T is not stored in the animation data management mechanism 54, it is determined by interpolation of the object positions for times which are stored in this animation data management mechanism 54.

The position of a moving object at time T is determined, after which at step 2 (v2) a straight line which passes through this position and which is parallel to the direction indicated by the direction data is established, the position of the intersections of that straight line with an object being determined. In this example, because the direction of the force of gravity is used as the direction data, in accordance with the processing of step 2, the determination will be made of the position of intersections with an object in the vertical direction.

Next, at step 3 (v3), of the positions of intersections which are determined at step 2, the intersecting position which is most distant in a direction which is opposite the direction indicated by the direction data is determined. In this example, because the direction of the force of gravity is used as the direction data, in accordance with the processing of step 3, the determination will be made of the intersecting point among the object intersecting points that is the highest.

Then, at step 4 (v4), from the position of the intersection which was determined at step 3, position data is derived by displacing this position in a direction opposite that indicated by the direction data by an amount equal to the displacement data which is stored in the animation data management mechanism 54, correction being made by replacing the position data of the moving object determined at step 1 with the derived position data. In this example, because the direction of the force of gravity is used as the direction data, in accordance with the processing of step 4, the position data of the moving object determined at step 1 is corrected to the position data an amount H above the position determined at step 3.

Next, at step 5 (v5), the animation path which is specified from the corrected position determined at step 4 is stored in the display data storage mechanism 62, and processing is ended.

Figure 26:
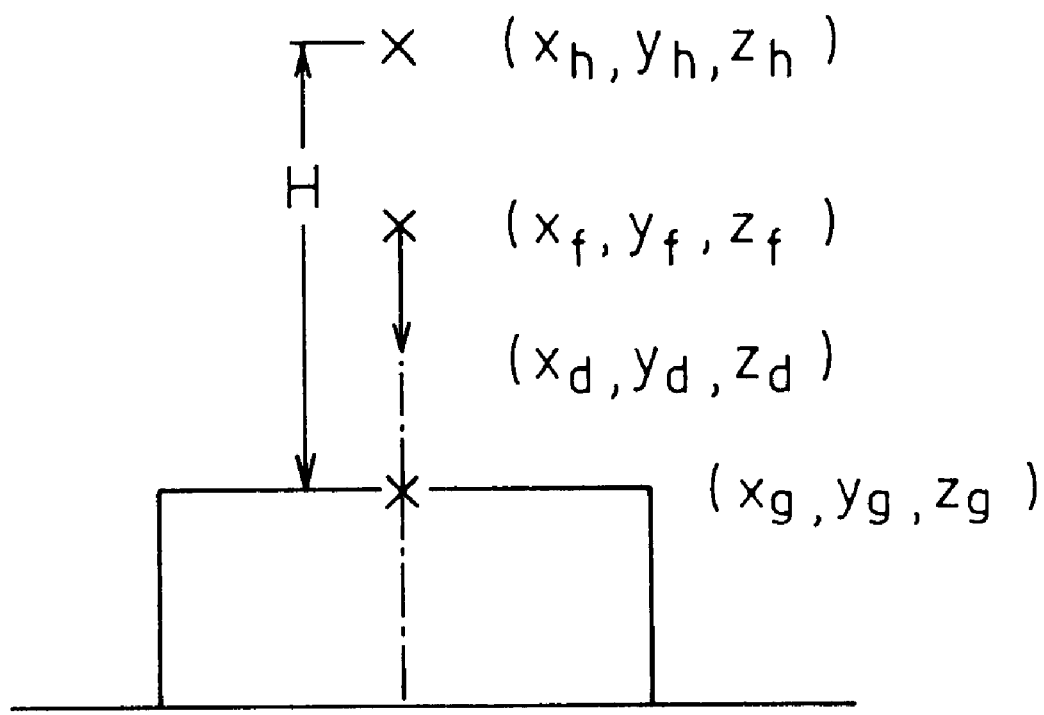
FIG. 26 is a drawing which illustrates the processing in an animation path generating mechanism.

In this manner, by executing the processing flow shown in FIG. 25, the animation path generating mechanism 58, as shown in FIG. 26, determines the position $(x_f, y_f, z_f)$ of the moving object at time T at step 1, after which, in accordance with the direction data $(x_d, y_d, z_d)$ which indicates the direction of the force of gravity, the position of intersection $(x_g, y_g, z_g)$ that is highest in the vertical direction is determined at step 3, after which at step 4 the position $(x_f, y_f, z_f)$ which was determined at step 1 is corrected so that it is the position $(x_h, y_h, z_h)$ that is higher than this position $(x_g, y_g, z_g)$ by the amount of the displacement data H. That is, the position $(x_f, y_f, z_f)$ of the moving object at time T is corrected to the position $(x_h, y_h, z_h)$, defined as $(x_h, y_h, z_h)=(x_f, y_f, z_f)+\{((\text{Distance between } (x_f, y_f, z_f) \text{ and } (x_g, y_g, z_g))-H\}\times(x_d, y_d, z_d)$.

As described above, the animation generating mechanism 60 uses the animation path which is generated by the animation path generating mechanism 58 to generate an animation and store this in the display data storage mechanism 62, thereby performing the processing for presenting the animation on a display screen.

Figure 27A:
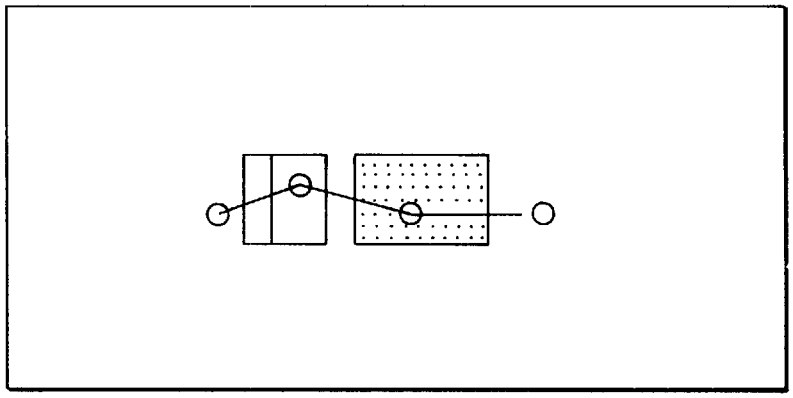
FIG. 27A, FIG. 27B, and FIG. 27C are drawings which illustrate the processing in an animation path generating mechanism.
Figure 27B:
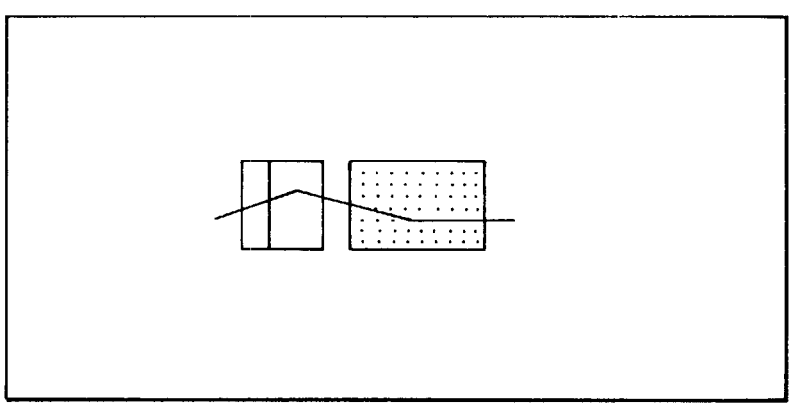
Figure 27C:
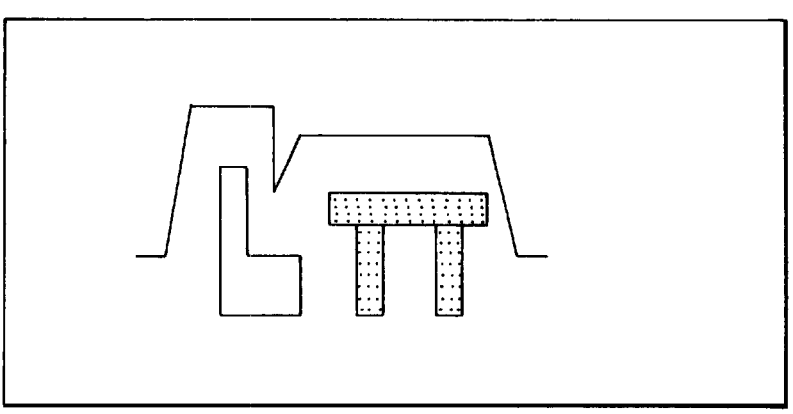

In this manner, when the animation path input mechanism 56, as shown in FIG. 27A, sets the animation path of a moving object by using a perspective which is projected onto a plane which is perpendicular to the force of gravity, this being done by means of interaction with the user, the animation path generating mechanism 58, as shown in FIG. 27B, while maintaining the path position on the plane which intersects perpendicularly with the direction of the force of gravity as is, as shown in FIG. 27C, corrects the position in the direction of gravity to a position that is higher by the displacement data H than the highest object, thereby generating the animation path which is used by the animation generating mechanism 60.

In this manner, it is possible to generate an animation which moves a moving object along the ground or buildings, even without setting the path of the moving object 3-dimensionally.

Figure 28:
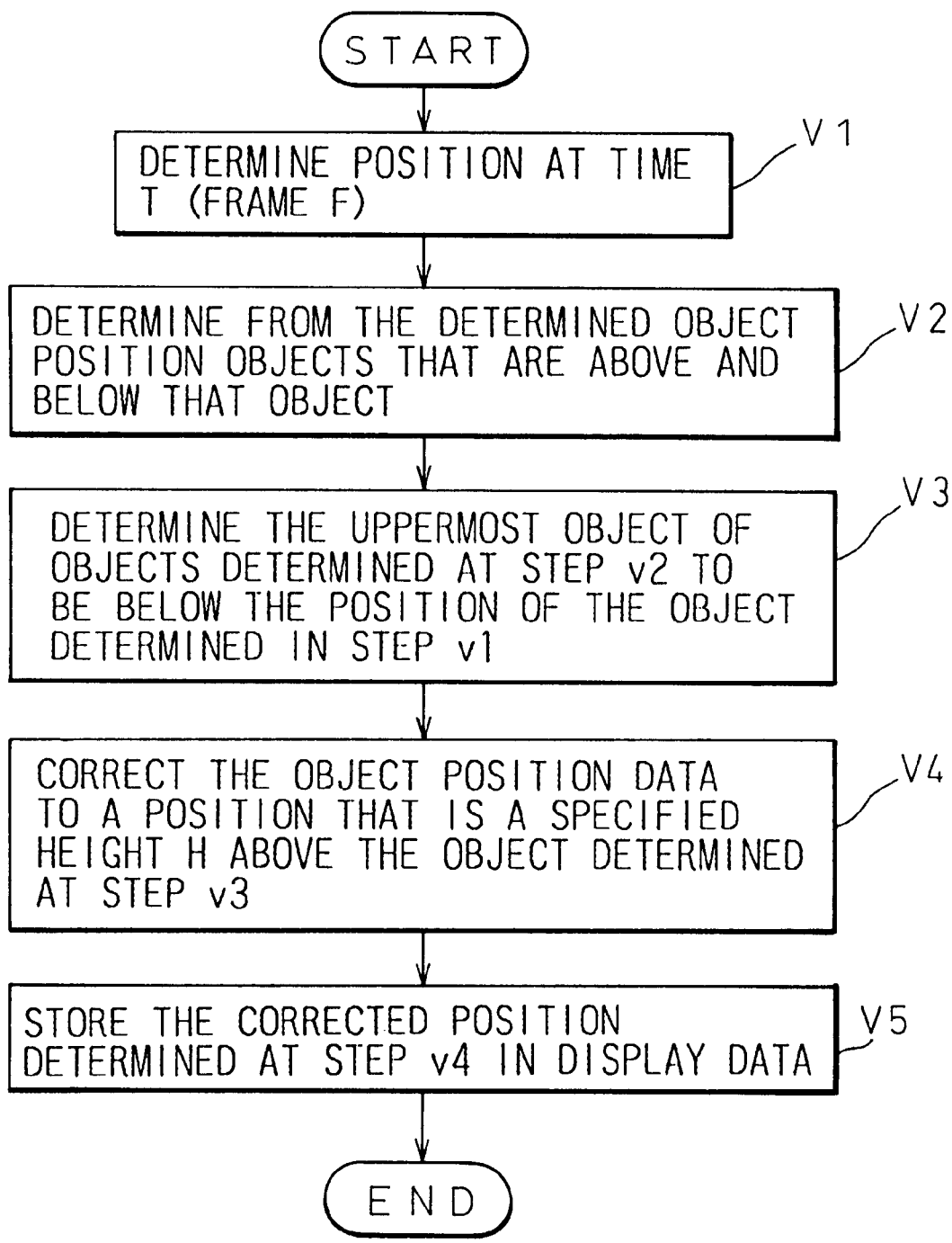
FIG. 28 is a flowchart which shows another example of the flow of processing in an animation path processing mechanism.

FIG. 28 shows another example of the processing flow for animation generation, which is executed by the animation path generating mechanism 58. In this processing flow, as is the case with the processing flow shown in FIG. 25, the user selects a projection plane which perpendicularly intersects with the direction of the force of gravity, the assumption being made that the animation path set is of a moving object in a perspective view projected onto that plane. That is, the direction data indicated in FIG. 23 represents the direction of the force of gravity, and the displacement data indicated in FIG. 23 is used for the purpose of setting the path position of the direction of the force of gravity, which is not established at the animation path input mechanism 56.

According to this processing flow, when the animation path generating mechanism 58 generates the animation path, first at step 1 (v1), in the same manner as at step 1 shown in the processing flow shown in FIG. 25, it calculates the position of the moving object at the time T set by the animation generating mechanism 60, in accordance with management data of the animation data management mechanism 54.

The position of a moving object at time T is determined, after which at step 2 (v2), in the same manner as at step 1 shown in the processing flow shown in FIG. 25, a straight line which passes through this position and which is parallel to the direction indicated by the direction data is established, the position of the intersections of that straight line with objects being determined. In this example, because the direction of the force of gravity is used as the direction data, in accordance with the processing of step 2, the determination will be made of the position of intersections with objects in the vertical direction.

Next, at step 3 (v3), of the positions of intersections which were determined at step 2, the intersecting position which is positioned in the direction indicated by the direction data and which is closest to the position of the moving object which was determined in step 1 is determined. In this example, because the direction of the force of gravity is used as the direction data, in accordance with the processing of step 3, the determination will be made of the intersecting point among the object intersecting points that were determined at step 2 which is downward (that is, in the direction of the force of gravity) and which also is uppermost in position. Whether or not an object determined at step 2 is downward and whether or not it is upward is judged as follows. If the position of the object determined at step 1 as $(x_f, y_f, z_f)$ and the position of the intersection point with the object is $(x_g, y_g, z_g)$, if all the conditions $$(x_g - x_f) \times x_d \leq 0,$$

$$(x_g - x_f) \times x_d \leq 0, \text{ and}$$

$$(x_g - x_f) \times x_d \leq 0$$

are satisfied, the object is in the downward direction. If they are not satisfied, the object is in the upward direction.

Then, at step 4 (v4), from the position of the intersection which was determined at step 3, the position data which is derived by displacing this position in a direction opposite that indicated by the direction data by an amount equal to the displacement data which is stored in the animation data management mechanism 54, correction being made by replacing the displacement data in the direction of the position data of the moving object determined at step 1 with the determined position data. In this embodiment, because the direction of the force of gravity is used as the direction data, in accordance with the processing of step 4, the position data in the direction of the force of gravity of the position data of the moving object determined at step 1 is corrected to the position data an amount H above the position determined at step 2.

Next, at step 5 (v5), the animation path which is specified from the corrected position determined at step 4 is stored in the display data storage mechanism 62, and processing is ended.

As described above, the animation generating mechanism 60 uses the animation path which is generated by the animation path generating mechanism 58 to generate an animation and store this in the display data storage mechanism 62, thereby performing the processing for presenting the animation on a display screen.

In this manner, when the animation path input mechanism 56 sets the animation path of a moving object by using a perspective which is projected onto a plane which is perpendicular to the force of gravity, this being done by means of interaction with the user, the animation path generating mechanism 58, while maintaining the path position on the plane which intersects perpendicularly with the direction of the force of gravity as is, corrects the animation path so that it is higher by the displacement data than the highest object, thereby generating the animation path which is used by the animation generating mechanism 60.

In this manner, it is possible to generate an animation which moves a moving object along a floor or ceiling, even without setting the path of the moving object 3-dimensionally.

In FIG. 23, the disclosure is of a configuration in which the direction data and the displacement data managed by the animation data management mechanism 54 are common to all moving objects, and it is normally necessary to store this direction data and displacement data in accordance with the attributes of the moving objects.

Figure 29:
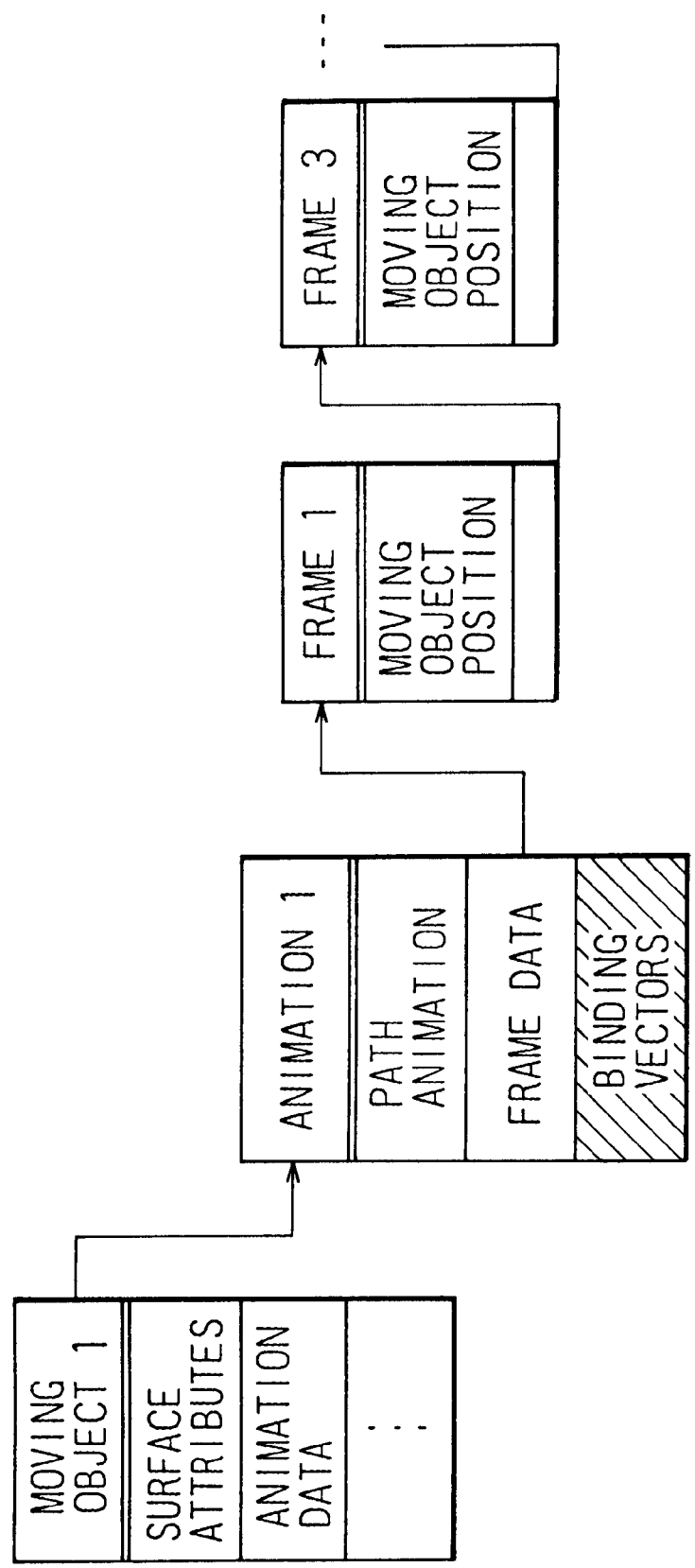
FIG. 29 is a drawing which illustrates another embodiment of the present invention.

In the case of a plurality of moving objects, as shown in FIG. 29, the configuration to be used is one in which binding vectors, which are formed from this direction data and displacement data, are stored separately for each moving object. By adopting this configuration, it is possible to implement an animation in which there is one object moving at a fixed distance from another object, and another object moving at a fixed lateral distance from yet another object.

In the processing flows shown in FIG. 25 and FIG. 28, although the disclosure is of a configuration in which when the position of a moving object at time T is determined at step 1, at step 2 a straight line is determined which passes through this position and is parallel to the direction indicated by the direction data, all objects which intersect with that straight line being searched, it is also possible to remove small objects from the search operation to have a configuration which enables high-speed processing.

Figure 30:
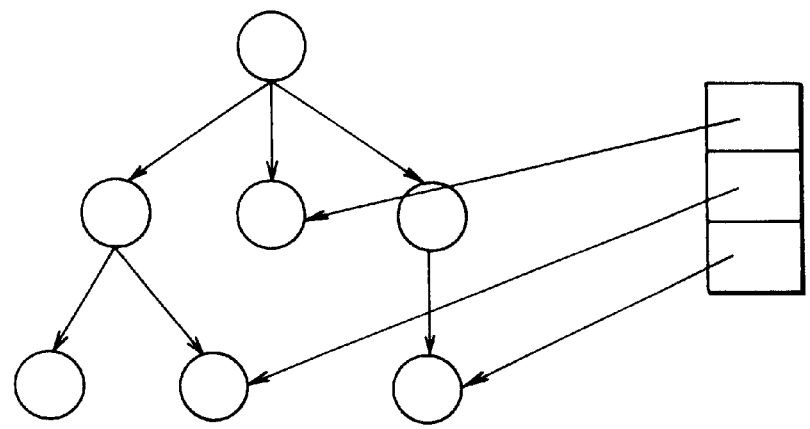
FIG. 30 is a drawing which illustrates another embodiment of the present invention.

When using this configuration, as shown in FIG. 30, an object list indicating exactly which objects are to be searched for among the objects which make up the virtual world is prepared, the objects in this object list being taken as the ones for searching.

Figure 31A:
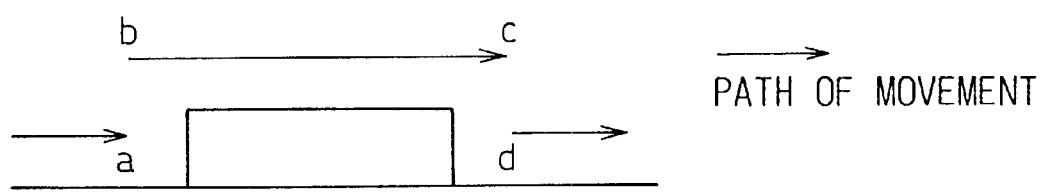
FIG. 31A and FIG. 31B are drawings which illustrate another embodiment of the present invention.
Figure 31B:
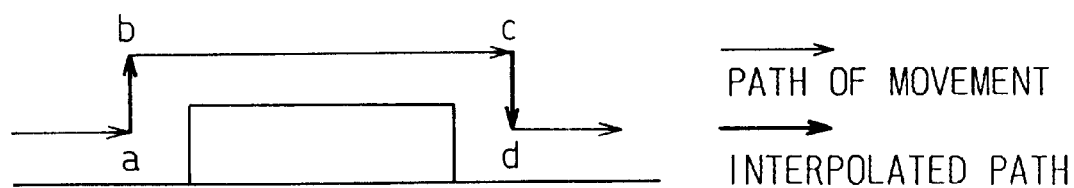

When following the processing flows as shown in FIG. 25 and FIG. 28, there are cases in which a sudden change occurs in a corrected path. For example, when the corrected path that is shown in FIG. 31A is determined, during execution of the animation from position a to position b, there is an instantaneous motion, as there is also when executing the animation from the position c to the position d.

To solve the problem that the above condition presents, in the case in which the difference between the corrected data of the previous frame and the current frame exceeds a threshold value, the configuration can be made such that data for an interpolated path between the previous frame and the current frame is generated. By adopting this configuration, the corrected path shown in FIG. 32A is changed to the path shown in FIG. 32B, thereby making it conform to reality. In this configuration, the underlined position correction part of the equation $$(x_h, y_h, z_h) = (x_f, y_f, z_f) -$$
$$\{((\text{Distance between } (x_f, y_f, z_f) \text{ and } (x_g, y_g, z_g)) - H\} \times (x_d, y_d, z_d)$$

is prepared for each frame, the above scheme of interpolation being employed by making a test as to whether or not the difference between the prepared value for the previous frame and the prepared value for the current frame exceeds a threshold value.

What is claimed is:

1. A computer graphics data generating apparatus for generating, from data that defines a virtual object made up of polygons, an intermediate CG data file that requires further processing prior to producing visible output, said CG data generating apparatus comprising:

a light ray generator which virtually generates a plurality of light rays originating from a plurality of points for analyzing each polygon in the data;

an intersecting judge which identifies whether each of said light rays intersects with said polygons which make up said object; and a data deleting section to eliminate, from the data defining the virtual object, all data corresponding to first polygons for which a judgment has been made that none of said light rays intersects therewith, whereby only data corresponding to second polygons for which at least one of said light rays intersects, therefore which might possibly be seen, is left, and to save resultant CG data in the intermediate CG data file.

2. A CG data generating apparatus according to claim 1, wherein the plurality of generated light rays are aimed from outside said object to the inside of said object.

3. A CG data generating apparatus according to claim 1, wherein with regard to an object which is viewed from the outside, said light ray generator generates light rays aimed from outside said object to the inside of said object, wherein with regard to an object which is viewed from inside only, said light ray generator generates light rays aimed from inside said object to the outside of said object, and wherein with regard to an object that has the possibility of being viewed from both inside and outside, said light ray generator generates both light rays aimed from outside said object to the inside of said object and light rays from inside said object to the outside of said object.

4. A CG data generating apparatus according to claim 1, wherein said intersecting judge includes a first judgment section for performing a judgment concerning the light rays aimed from outside said object to the inside of said object, and a second judgment section for performing a judgment concerning light rays aimed from inside said object to the outside of said object, and wherein said data deleting section includes a first deleting section for eliminating data corresponding to a polygon which is judged by said first judgment section to intersect with none of the plurality of light rays, thereby generating first CG data suitable for making a CG image of said object when viewed from outside, said a second deleting section for eliminating data corresponding to a polygon which is judged by said first judgment section to intersect with none of the plurality of light rays, thereby generating second CG data suitable for making a CG image of said object when viewed from inside.

5. A CG animation editing apparatus for generating CG animation of a virtual object from CAD data which defines the object as a plurality of polygons, said CG animation editing apparatus comprising:

a light ray generator to virtually generate a plurality of light rays originating from a plurality of points;

an intersecting judge to identify whether each of said light rays intersects with said polygons which make up said object;

a data deleting section to eliminate all of the CAD data corresponding to polygons for which a judgment has been made that no light ray intersects therewith indicating that such polygons could not be viewed, while leaving all of the CAD data corresponding to remaining polygons for which at least one of said light rays intersects indicating that the remaining polygons may be viewed, to produce an intermediate CG data file; and a CG animation generating section to generate CG animation using said intermediate CG data file.

6. A CG animation editing apparatus according to claim 5, wherein the plurality of generated light rays are aimed from outside said object to the inside of said object.

7. A CG animation editing apparatus according to claim 5, wherein with regard to an object which is viewed from the outside, said light ray generator generates light rays aimed from outside said object to the inside of said object, wherein with regard to an object which is viewed from inside only, said light ray generator generates light rays aimed from inside said object to the outside of said object, and wherein with regard to an object that has the possibility of being viewed from both inside and outside, said light ray generator generates both light rays aimed from outside said object to the inside of said object and light rays aimed from inside said object to the outside of said object.

8. A CG animation editing apparatus according to claim 6, wherein said intersecting judge includes a first judgment section for performing a judgment concerning light rays aimed from outside said object to the inside of said object, and a second judgment section for performing a judgment concerning light rays aimed from inside said object to the outside of said object, and wherein said data deleting section includes a first deleting section for eliminating data corresponds to a polygon which is judged by said first judgment section to interest with none of the plurality of light rays, thereby generating first CG data suitable for making a CG image of said object when viewed from outside, and a second deleting section for eliminating data corresponding to a polygon which is judged by said first judgment section to intersect with none of the plurality of light rays, thereby generating a second CG data suitable for making a CG image of said object when viewed from inside, said CG animation editing apparatus further comprising a viewing point judgment section which judges whether the current viewing point is inside an object or outside an object, and said CG animation generating section selecting one of said first and second CG data, in accordance with judgment of said viewing point judgment section, thereby generating CG animation.

9. A computer graphics data generating apparatus for generating, from data that defines a virtual object made up of polygons, an intermediate CG data file that requires further processing prior to producing visible output, said CG data generating apparatus comprising:

a light ray generator that virtually generates a plurality of light rays originating from a plurality of points corresponding to possible viewing points of the virtual object;

an intersecting judge which identifies whether each of said light rays intersects with said polygons which make up the virtual object; and a data deleting section to eliminate, from the data defining the virtual object, all data corresponding to first polygons for which a judgment has been made that none of said light rays intersects therewith, while leaving all data corresponding to second polygons for which at least one of said light rays intersects, thereby generating CG data without the data corresponding to the first polygons which cannot be seen from any possible viewing angle and saving the CG data into an intermediate CG data file for future use by an animation or graphics program.

10. A CG data generating apparatus according to claim 9, wherein the plurality of generated light rays are aimed from outside the virtual object to the inside of the virtual object.

11. A CG data generating apparatus according to claim 9, wherein with regard to a virtual object which is viewed from the outside, said light ray generator generates light rays aimed from outside said object to the inside of the virtual object, wherein with regard to an object which is viewed from inside only, said light ray generator generates light rays aimed from inside the virtual object to the outside of the virtual object, and wherein with regard to a virtual object that has the possibility of being viewed from both inside and outside, said light ray generator generates both light rays aimed from outside the virtual object to the inside of the virtual object and light rays from inside the virtual object to the outside of the virtual object.

* * * * *

UNITED STATES PATENT AND TRADEMARK OFFICE
CERTIFICATE OF CORRECTION

PATENT NO. : 6,473,083 B1
DATED : October 29, 2002
INVENTOR(S) : Kaori Suzuki et al.

It is certified that error appears in the above-identified patent and that said Letters Patent is hereby corrected as shown below:

<u>Column 23,</u>
Line 60, change "said" to -- and --.

Signed and Sealed this

Twenty-fifth Day of March, 2003

JAMES E. ROGAN
*Director of the United States Patent and Trademark Office*